US008306361B2

(12) United States Patent  (10) Patent No.: US 8,306,361 B2
Nakamura et al.  (45) Date of Patent: Nov. 6, 2012

(54) HIGH-SPEED HIGH-ACCURACY MATRIX SINGULAR VALUE DECOMPOSITION METHOD, PROGRAM, AND DEVICE

(75) Inventors: Yoshimasa Nakamura, Osaka (JP); Masashi Iwasaki, Osaka (JP); Shinya Sakano, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 1108 days.

(21) Appl. No.: 11/569,898

(22) PCT Filed: Jun. 1, 2005

(86) PCT No.: PCT/JP2005/010084
§ 371 (c)(1),
(2), (4) Date: Aug. 25, 2008

(87) PCT Pub. No.: WO2005/119507
PCT Pub. Date: Dec. 15, 2005

(65) Prior Publication Data
US 2009/0028455 A1  Jan. 29, 2009

(51) Int. Cl.
*G06K 9/36* (2006.01)
*G06K 9/00* (2006.01)
(52) U.S. Cl. .......................... 382/285; 154/305
(58) Field of Classification Search .............. 382/285, 382/100, 154, 106, 190, 205, 305, 294, 276; 707/600–602, 769, 739; 345/419, 427; 348/42, 348/50; 708/446, 650
See application file for complete search history.

(56) References Cited

U.S. PATENT DOCUMENTS

| | | | | |
|---|---|---|---|---|
| 6,009,190 | A * | 12/1999 | Szeliski et al. | 382/154 |
| 6,134,541 | A * | 10/2000 | Castelli et al. | 1/1 |
| 6,314,419 | B1 * | 11/2001 | Faisal | 707/739 |
| 6,993,179 | B1 * | 1/2006 | Weinshall et al. | 382/154 |
| 7,194,112 | B2 * | 3/2007 | Chen et al. | 382/106 |
| 8,107,735 | B2 * | 1/2012 | Shimizu et al. | 382/190 |
| 8,160,368 | B2 * | 4/2012 | Nakamura et al. | 382/205 |

(Continued)

FOREIGN PATENT DOCUMENTS

JP  10-031747  2/1998

(Continued)

OTHER PUBLICATIONS

Kakarala et al. Signal Analysis Using a Multiresolution Form of the Singular Value Decomposition, IEEE 1057-7149/01, 2001, pp. 724-735.*

(Continued)

*Primary Examiner* — Ishrat I Sherali
(74) *Attorney, Agent, or Firm* — Snell & Wilmer L.L.P.

(57) ABSTRACT

A singular value decomposition method according to the present invention is a method for performing a singular value decomposition on an arbitrary matrix A using a computer, the method including the steps of: performing an upper bidiagonalization on the matrix A so as to obtain an upper bidiagonal matrix B of the matrix A; obtaining at least one singular value $\sigma$ of the matrix B as singular values of the matrix A; and obtaining a singular vector of the matrix A for the $\sigma$. The step of obtaining a singular vector of the matrix A includes a step of performing a Twisted decomposition on a matrix $B^T B - \sigma^2 I$ (where I is a unit matrix) by using a Miura inverse transformation, an sdLVvs transformation, an rdLVvs transformation and a Miura transformation so as to diagonalize a matrix $B^T B$.

6 Claims, 11 Drawing Sheets

U.S. PATENT DOCUMENTS

2009/0216821 A1* 8/2009 Nakamura et al. ............ 708/446
2010/0185716 A1* 7/2010 Nakamura et al. ............ 708/650

FOREIGN PATENT DOCUMENTS

JP 2002-202983 7/2002

OTHER PUBLICATIONS

Nakamura, Y., "A New Approach to Numerical Algorithms in Terms of Integrable Systems", Informatics Research for Development of Knowledge Society Infrastructure, 2004, ICKS 2004, International Conference on Mar. 1-2, 2004; pp. 194-205.
Iwasaki, et al., "An application of the discrete Lotka-Volterra system with variable step-size to singular value computation", Inverse Problems vol. 20, pp. 553-563.
Iwasaki, et al., "An application of the arbitrary step-size Lotka-Volterra system to singular value computation" (2 pages).
Sogo, K., "Toda Molecule Equation and Quotient-Difference Method", Apr. 26, 1993, pp. 69-75.
QD, pp. 1-3 - 1-4.
Nakamura, Y., "Soliton Theory and Numerical Calculations", vol. 80, No. 11, pp. 1143-1146, Nov. 1997.
Unknown article, vol. 43, No. 11, pp. 584-591, 1999.
Unknown article, 19921012, pp. 157-159.
International Search Report dated Aug. 16, 2005.
Examination Report dated Jun. 27, 2006.
Tomasi, C. and Kanade T., "Shape and Motion from Image Streams Under Orthography: a Factorization Method," International Journal of Computer Vision, Nov. 9, 1992, No. 2, Norwell Ma, US, pp. 137-154.
Tomasi, C. and Kanade, T., "Factoring Image Sequences into Shape and Motion," Visual Motion, 1991, Proceedings of the IEEE Workshop on Princeton, NJ, Oct. 7-9, 1991, pp. 21-28.
Iwasaki, M. and Nakamura, Y., "On the convergence of a solution of the discrete Lotka-Volterra system," Inverse Problems, vol. 18, No. 6, Oct. 25, 2002, pp. 1569-1578.
Tsujimoto, S., Nakamura, Y., and Iwasaki, M., "The discrete Lotka-Volterra system computes singular values," Inverse Problems, vol. 17, No. 1, Feb. 2001, pp. 53-58.
Nakamura, Y. and Iwasaki, M., "I-SVD: A New Singular Value. Decomposition Algorithm With a High Relative Accuracy," Internet Citation, Jul. 3, 2004, retrieved from http://www.math.tu-berlin.de/kressner/GAMM04/files/nakamura.pdf [retrieved Jun. 10, 2010].
Dhillon, I.S and Parlett, B.N., "Orthogonal Eigenvectors and Relative Gaps," Siam J. Matrix Anal. Appl., vol. 25, No. 3, Mar. 30, 2004, pp. 858-899.
The European Search Report from corresponding Application No. 05746027.1 dated Jul. 28, 2010.

* cited by examiner

Procedure 1

Procedure 2

Trans 0

Trans 1

Trans 2

Method by Parlett

Method according to the
present invention

FIG. 12

1202 Receive query vector q

1204 Upper-bidiagonalize index word document matrix D

1206 Compute singular values of index word document matrix D

1208 Select k

1210 Compute first k number of singular vectors

1212 Compute similarity between $D_k$ and q

1214 Output search result

HIGH-SPEED HIGH-ACCURACY MATRIX SINGULAR VALUE DECOMPOSITION METHOD, PROGRAM, AND DEVICE

CROSS-REFERENCE TO RELATED APPLICATIONS

This application is a U.S. national phase filing under 35 U.S.C. §371 of PCT/JP2005/010084 filed Jun. 1, 2005 and claims priority from JP 2004-166437 filed Jun. 3, 2004.

TECHNICAL FIELD

The present invention relates to a method, program and apparatus for performing a high-speed and high-precision singular value decomposition on arbitrary matrix A. More specifically, the present invention relates to a method, program and apparatus for performing a high-speed and high-precision singular value decomposition by computing singular values of a matrix and computing singular vectors for the computed singular values.

BACKGROUND ART

At present, a standard method used in order to perform a singular value decomposition in a computer is a DBDSQR routine published by international-known numerical computation library LAPACK. This DBDSQR routine was created based on a QR method and can be divided into three sections; preprocess, main loop and postprocess. The preprocess computes an upper limit and lower limit of a singular value and computes precision used for a convergence criterion. The main loop gradually perform divisions and reductions of a matrix while repeating a QR method and completes a process when the size of the matrix eventually becomes 1×1. When a block of matrix 2×2 appears while the main loop is being performed, another process is performed. The postprocess changes, where computed singular values are changed from negative to positive values. If necessary, the postprocess performs a scalar multiplication on the singular values. The singular values are rearranged in the descending order, and singulars vectors are also rearranged so as to correspond to the singular values. In a DBDSQR, an extremely large amount of computation is required and thus, it is not possible to avoid an increase of time to be required for a computation, especially in a large-scale problem. In a DBDSQR routine, singular values and singular vectors are simultaneously computed. LAPACK publishes a DLASQ routine for computing singular values and a DSTEGR routine for diagonalization, which is used when singular vectors are computed by using the computed singular values. A DLASQ routine can obtain singular values at high speed with high precision. However, it can not compute singular vectors. In view of such a numerical defect, it is difficult to practically use a DSTEGR routine for a singular value decomposition.

Using a DBDSQR routine published by LAPACK as an example, a conventional singular value decomposition method will be described. A DBDSQR routine first applies a Householder transformation to standard matrix A having $l_1 \times l_2$ in order to perform a singular value decomposition on the matrix A. In other words, the matrix A can be represented by using orthogonal matrices $U_A$ and $U_V$ as:

$$U_A^T A V_A = \begin{cases} (B\ 0) & (l_1 \leq l_2) \\ \begin{pmatrix} B \\ 0 \end{pmatrix} & (l_1 \geq l_2) \end{cases}, \qquad \text{[Expression 4]}$$

$$B = \begin{pmatrix} b_1 & b_2 & & & \\ & b_3 & \ddots & & \\ & & \ddots & b_{2m-2} & \\ 0 & & & & b_{2m-1} \end{pmatrix}$$

$$U_A^T U_A = I,$$
$$V_A^T V_A = I,$$
$$m = \min\{l_1, l_2\}$$

B obtained in this case is called upper bidiagonal matrix. Herein, it should be noted that a singular value of A=a singular value of B. Accordingly, a singular value decomposition problem for the standard matrix A is replaced with a singular value decomposition problem for upper bidiagonal matrix $B^T B$, $$B = U_B \Sigma V_B^T$$

where matrices $U_B$ and $V_B$ are left and right orthogonal matrices, respectively,
$\Sigma \equiv \text{diag}(\sigma_1, \sigma_2, \ldots, \sigma_m) \sigma_1 \geq \sigma_2 \geq \ldots \sigma_m \geq 0$, and
$\sigma_j$ is a singular value of B.
Next, matrix $B^T B$ will be considered. Diagonalization of this matrix B is performed by:

$$\Lambda = V^T B^T B V$$

where $\Lambda \equiv \text{diag}(\lambda_1, \lambda_2, \ldots, \lambda_m)\ \lambda_1 \geq \lambda_2 \geq \ldots \lambda_m \geq 0$
$V \equiv (v_1, v_2, \ldots, v_m)$
$\lambda_j$ is an eigenvalue of $B^T B$, and
$v_j$ is an eigenvector for the eigenvalue $\lambda_j$.
Herein, the following is normally established: (1) $B^T B$ is a symmetric tridiagonal matrix; (2) Eigenvalues of $B^T B$ are all positive, and singular value $\sigma_j$ ($\sigma_1 \geq \sigma_2 \geq \ldots \geq \sigma_m \geq 0$) of B is equal to a positive square root of eigenvalue $\lambda_j$ ($\lambda_1 \geq \lambda_2 \geq \ldots \geq \lambda_m \geq 0$) of $B^T B$; (3) $V_B = V$, i.e., eigenvector $v_j$ of $B^T B$ is equal to a right singular vector of B. Accordingly, when the diagonalization of the matrix $B^T B$ has been obtained, $\Sigma$ is obtained since $\Lambda = \Sigma^2$ from (2), and further, left orthogonal matrix $U_B = BV_B \Sigma^{-1} = BV\Sigma^{-1}$ is obtained from (3). Therefore, B is singular-value-decomposed. In other words, the singular value decomposition of B can be replaced with a problem of diagonalization of $B^T B$. Not only can this principle be applied to obtaining all m number of singular values and singular vectors, but also this principle can be applied to obtaining at least one singular value and singular vector.

As described above, the singular value decomposition of the standard matrix A includes the problem of diagonalization of the symmetric tridiagonal matrix $B^T B$.

DISCLOSURE OF THE INVENTION

Since a DBDSQR routine requires an extremely large amount of computation, it is difficult for a DBDSQR routine to perform a high-speed singular value decomposition, especially in a large-scale problem. In contrast, a DLASQ routine can obtain singular values at high speed with high precision, yet in some cases, a DSTEGR routine computes singular vectors at low precision. Thus, it is difficult for a DSTEGR routine to always perform a singular value decomposition at high precision.

One objective of the present invention is to provide a method, program and apparatus capable of performing a diagonalization of symmetric tridiagonal matrix $B^TB$ at high-speed with high-precision so as to perform a high-speed and high-precision singular value decomposition on arbitrary matrix A. Herein, matrix B is an upper bidiagonal matrix obtained by performing a Householder transformation on matrix A.

According to the present invention, matrix $B^TB$ is diagonalized by performing a Twisted decomposition by using a Miura inverse transformation, an sdLVvs transformation, an rdLVvs transformation and a Miura transformation. Herein, matrix B is an upper bidiagonal matrix having the same singular values as matrix A. Transformation from matrix A to matrix B is performed, for example, by a Householder method. In the diagonalization of the matrix $B^TB$ according to the present invention, first, eigenvalues are computed and thereafter, eigenvectors are obtained by using the computed eigenvalues, the way of which is the same as a DSTEGR routine and different from a DBDSQR routine for simultaneously obtaining eigenvalues and eigenvectors.

According to the present invention, a method is provided for performing a singular value decomposition on an arbitrary matrix A using a computer, the method including the steps of: performing an upper bidiagonalization on the matrix A so as to obtain an upper bidiagonal matrix B of the matrix A; obtaining at least one singular value σ of the matrix B as singular values of the matrix A; and obtaining a singular vector of the matrix A for the σ, wherein the step of obtaining a singular vector of the matrix A includes a step of performing a Twisted decomposition on a matrix $B^TB-\sigma^2I$ by using a Miura inverse transformation, an sdLVvs transformation, an rdLVvs transformation and a Miura transformation so as to diagonalize a matrix $B^TB$, where I is a unit matrix, thereby the objective described above being achieved.

The step of obtaining a singular vector of the matrix A may include a step of performing an inverse iteration method after the step of diagonalizing the matrix $B^TB$.

The step of obtaining a singular vector of the matrix A may include a step of performing a Gram-Schmidt method after the step of performing the inverse iteration method.

The step of obtaining at least one singular value σ of the matrix B may include a step of performing a dLVs routine.

The step of obtaining at least one singular value σ of the matrix B may include a step of determining whether a dLVs routine or a DLASQ routine should be performed depending on an amount of computation time and precision to be required.

The step of performing an upper bidiagonalization on the matrix A so as to obtain an upper diagonal matrix B may include a step of performing a Householder method.

According to the present invention, a method is provided for restoring a three-dimensional image from a plurality of two-dimensional images of an object, the method including the steps of: extracting coordinates $d_{ij}$ ($x_{ij}$, $y_{ij}$) of feature points i (i=1, ..., n, where n is an integer greater than or equal to 2) in two-dimensional images j (j=1, ..., m, where m is an integer greater than or equal to 3); and computing three-dimensional coordinates $s_i$ ($X_i$, $Y_i$, $Z_i$) of the feature points and a matrix M representing a transformation from two-dimensional coordinates to three-dimensional coordinates based on the two-dimensional coordinates $d_{ij}$ ($x_{ij}$, $y_{ij}$) of the feature points, wherein the step of computing three-dimensional coordinates $s_i$ ($X_i$, $Y_i$, $Z_i$) of the feature points and a matrix M representing a transformation from two-dimensional coordinates to three-dimensional coordinates includes the steps of: performing an upper bidiagonalization on a matrix D so as to obtain an upper bidiagonal matrix B of the matrix D, the matrix D being defined as $$D = \begin{bmatrix} x_1^1 & \ldots & x_i^1 & \ldots & x_n^1 \\ \ldots & \ldots & \ldots & \ldots & \ldots \\ x_1^j & \ldots & x_i^j & \ldots & x_n^j \\ \ldots & \ldots & \ldots & \ldots & \ldots \\ x_1^m & \ldots & x_i^m & \ldots & x_n^m \\ y_1^1 & \ldots & y_i^1 & \ldots & y_n^1 \\ \ldots & \ldots & \ldots & \ldots & \ldots \\ y_1^j & \ldots & y_i^j & \ldots & y_n^j \\ \ldots & \ldots & \ldots & \ldots & \ldots \\ y_1^m & \ldots & y_i^m & \ldots & y_n^m \end{bmatrix};$$

[Expression 5]

obtaining singular values $\sigma_j$ ($\sigma_1 \geq \sigma_2 \geq \ldots \geq \sigma_r > 0$, where r is equal to a rank of the matrix D) of the matrix B as singular values of the matrix D; obtaining singular vectors of the matrix D for $\sigma_1$, $\sigma_2$ and $\sigma_3$; computing a matrix E satisfying $E=CC^T$ for a matrix C such that M=M'C, where M'=L' $(\Sigma')^{1/2}$, $\Sigma'$ is a 3×3 matrix having $\sigma_1$, $\sigma_2$ and $\sigma_3$ as diagonal elements and the other elements being 0, and L' is a matrix having singular vectors of the matrix D corresponding to $\sigma_1$, $\sigma_2$ and $\sigma_3$ arranged from a left side in this order; computing the matrix C from the matrix E; and computing the three-dimensional coordinates $s_i$ ($X_i$, $Y_i$, $Z_i$) and the matrix M representing the transformation from the matrix C, wherein the step of obtaining singular vectors of the matrix D for $\sigma_1$, $\sigma_2$ and $\sigma_3$ includes a step of performing a Twisted decomposition on a matrix $B^TB-\sigma_j^2I$ by using a Miura inverse transformation, an sdLVvs transformation, an rdLVvs transformation and a Miura transformation so as to diagonalize a matrix $B^TB$, where I is a unit matrix, thereby the objective described above being achieved.

According to the present invention, a method is provided for searching information relating to a given keyword, the information being included in a given document, the method including the steps of: receiving query vector q corresponding to the keyword; performing an upper bidiagonalization on an index word document matrix D corresponding to the document so as to obtain an upper bidiagonal matrix B of the matrix D; obtaining singular values $\sigma_j$ ($\sigma_1 \geq \sigma_2 \geq \ldots \geq \sigma_r > 0$, where r is equal to a rank of the matrix D) of the matrix B as singular values of the matrix D; selecting k such that k<r; computing an approximate matrix $D_k$ of the matrix D, the matrix $D_k$ being defined as $D_k = U_k \Sigma_k V_k^T$ by using a matrix $\Sigma_k$ having $\sigma_1$, $\sigma_2$, ..., $\sigma_k$ as diagonal elements and the other elements being 0, and left and right orthogonal matrices $U_k$, $V_k$ having only singular vectors corresponding to $\sigma_1$, $\sigma_2$, ..., $\sigma_k$ arranged from a left side in this order; computing a similarity between the matrix $D_k$ and the query vector q; and outputting a search result based on the computed similarity, wherein the step of obtaining left and right orthogonal matrices $U_k$, $V_k$ of a matrix $D_k$ includes a step of performing a Twisted decomposition on a matrix $B^TB-\sigma_j^2I$ (j=1, 2, ..., k) by using a Miura inverse transformation, an sdLVvs transformation, an rdLVvs transformation and a Miura transformation so as to diagonalize a matrix $B^TB$, where I is a unit matrix, thereby the objective described above being achieved.

According to the present invention, a program is provided for causing a computer to execute a singular value decomposition process, the singular value decomposition process performing a singular value decomposition on an arbitrary matrix A, the singular value decomposition process including the steps of: performing an upper bidiagonalization on the matrix A so as to obtain an upper bidiagonal matrix B of the matrix A; obtaining at least one singular value σ of the matrix B as singular values of the matrix A; and obtaining a singular vector of the matrix A for the σ, wherein the step of obtaining a singular vector of the matrix A includes a step of performing a Twisted decomposition on a matrix $B^TB-\sigma^2I$ by using a Miura inverse transformation, an sdLVvs transformation, an rdLVvs transformation and a Miura transformation so as to diagonalize a matrix $B^TB$, where I is a unit matrix, thereby the objective described above being achieved.

According to the present invention, a program is provided for causing a computer to execute an image restoring process for restoring a three-dimensional image from a plurality of two-dimensional images of an object, the image restoring process including the steps of: extracting coordinates $d_{ij}$ ($x_{ij}$, $y_{ij}$) of feature points i (i=1, ..., n, where n is an integer greater than or equal to 2) in two-dimensional images j (j=1, ..., m, where m is an integer greater than or equal to 3); and computing three-dimensional coordinates $s_i$ ($X_i$, $Y_i$, $Z_i$) of the feature points and a matrix M representing a transformation from two-dimensional coordinates to three-dimensional coordinates based on the two-dimensional coordinates $d_{ij}$ ($x_{ij}$, $y_{ij}$) of the feature points, wherein the step of computing three-dimensional coordinates $s_i$ ($X_i$, $Y_i$, $Z_i$) of the feature points and a matrix M representing a transformation from two-dimensional coordinates to three-dimensional coordinates includes the steps of: performing an upper bidiagonalization on a matrix D so as to obtain an upper bidiagonal matrix B of the matrix D, the matrix D being defined as $$D = \begin{bmatrix} x_1^1 & \cdots & x_i^1 & \cdots & x_n^1 \\ \cdots & \cdots & \cdots & \cdots & \cdots \\ x_1^j & \cdots & x_i^j & \cdots & x_n^j \\ \cdots & \cdots & \cdots & \cdots & \cdots \\ x_1^m & \cdots & x_i^m & \cdots & x_n^m \\ y_1^1 & \cdots & y_i^1 & \cdots & y_n^1 \\ \cdots & \cdots & \cdots & \cdots & \cdots \\ y_1^j & \cdots & y_i^j & \cdots & y_n^j \\ \cdots & \cdots & \cdots & \cdots & \cdots \\ y_1^m & \cdots & y_i^m & \cdots & y_n^m \end{bmatrix};$$ [Expression 6]

obtaining singular values $\sigma_j$ ($\sigma_1 \geq \sigma_2 \geq \ldots \geq \sigma_r > 0$, where r is equal to a rank of the matrix D) of the matrix B as singular values of the matrix D; obtaining singular vectors of the matrix D for $\sigma_1$, $\sigma_2$ and $\sigma_3$; computing a matrix E satisfying $E=CC^T$ for a matrix C such that M=M'C, where M'=L'(Σ')$^{1/2}$, Σ' is a 3×3 matrix having $\sigma_1$, $\sigma_2$ and $\sigma_3$ as diagonal elements and the other elements being 0, and L' is a matrix having singular vectors of the matrix D corresponding to $\sigma_1$, $\sigma_2$ and $\sigma_3$ arranged from a left side in this order; computing the matrix C from the matrix E; and computing the three-dimensional coordinates $s_i$ ($X_i$, $Y_i$, $Z_i$) and the matrix M representing the transformation from the matrix C, wherein the step of obtaining singular vectors of the matrix D for $\sigma_1$, $\sigma_2$ and $\sigma_3$ includes a step of performing a Twisted decomposition on a matrix $B^TB-\sigma_j^2I$ by using a Miura inverse transformation, an sdLVvs transformation, an rdLVvs transformation and a Miura transformation so as to diagonalize a matrix $B^TB$, where I is a unit matrix, thereby the objective described above being achieved.

According to the present invention, a program is provided for causing a computer to execute a document search process for searching information relating to a given keyword, the information being included in a given document, the document search process including the steps of: receiving query vector q corresponding to the keyword; performing an upper bidiagonalization on an index word document matrix D corresponding to the document so as to obtain an upper bidiagonal matrix B of the matrix D; obtaining singular values $\sigma_j$ ($\sigma_1 \geq \sigma_2 \geq \ldots \geq \sigma_r > 0$, where r is equal to a rank of the matrix D) of the matrix B as singular values of the matrix D; selecting k such that k<r; computing an approximate matrix $D_k$ of the matrix D, the matrix $D_k$ being defined as $D_k = U_k \Sigma_k V_k^T$ by using a matrix $\Sigma_k$ having $\sigma_1, \sigma_2, \ldots, \sigma_k$ as diagonal elements and the other elements being 0, and left and right orthogonal matrices $U_k$, $V_k$ having only singular vectors corresponding to $\sigma_1, \sigma_2, \ldots, \sigma_k$ arranged from a left side in this order; computing a similarity between the matrix $D_k$ and the query vector q; and outputting a search result based on the computed similarity, wherein the step of obtaining left and right orthogonal matrices $U_k$, $V_k$ of the matrix $D_k$ includes a step of performing a Twisted decomposition on a matrix $B^TB-\sigma_j^2I$ (j=1, 2, ..., k) by using a Miura inverse transformation, an sdLVvs transformation, an rdLVvs transformation and a Miura transformation so as to diagonalize a matrix $B^TB$, where I is a unit matrix, thereby the objective described above being achieved.

According to the present invention, an apparatus is provided for performing a singular value decomposition on an arbitrary matrix A, the apparatus including: means for receiving the matrix A as an input; means for performing an upper bidiagonalization on the matrix A so as to compute an upper bidiagonal matrix B of the matrix A; means for computing at least one singular value σ of the matrix B as singular values of the matrix A; and means for computing a singular vector of the matrix A for the σ, wherein the means for computing a singular vector of the matrix A includes means for performing a Twisted decomposition on a matrix $B^TB-\sigma^2I$ by using a Miura inverse transformation, an sdLVvs transformation, an rdLVvs transformation and a Miura transformation so as to diagonalize a matrix $B^TB$, where I is a unit matrix, thereby the objective described above being achieved.

According to the present invention, an apparatus is provided for restoring a three-dimensional image from a plurality of two-dimensional images of an object, the apparatus including: means for receiving m number (m is an integer greater than or equal to 3) of two-dimensional images; means for extracting coordinates $d_{ij}$ ($x_{ij}$, $y_{ij}$) of feature points i (i= 1, ..., n, where n is an integer greater than or equal to 2) in two-dimensional images j (j=1, ..., m); and means for computing three-dimensional coordinates $s_i$ ($X_i$, $Y_i$, $Z_i$) of the feature points and a matrix M representing a transformation from two-dimensional coordinates to three-dimensional coordinates based on the two-dimensional coordinates $d_{ij}$($x_{ij}$, $y_{ij}$) of the feature points, wherein the means for computing three-dimensional coordinates $s_i$ ($X_i$, $Y_i$, $Z_i$) of the feature points and a matrix M representing a transformation from two-dimensional coordinates to three-dimensional coordinates includes: means for performing an upper bidiagonalization on a matrix D so as to obtain an upper bidiagonal matrix B of the matrix D, the matrix D being defined as $$D = \begin{bmatrix} x_1^1 & \cdots & x_i^1 & \cdots & x_n^1 \\ \cdots & \cdots & \cdots & \cdots & \cdots \\ x_1^j & \cdots & x_i^j & \cdots & x_n^j \\ \cdots & \cdots & \cdots & \cdots & \cdots \\ x_1^m & \cdots & x_i^m & \cdots & x_n^m \\ y_1^1 & \cdots & y_i^1 & \cdots & y_n^1 \\ \cdots & \cdots & \cdots & \cdots & \cdots \\ y_1^j & \cdots & y_i^j & \cdots & y_n^j \\ \cdots & \cdots & \cdots & \cdots & \cdots \\ y_1^m & \cdots & y_i^m & \cdots & y_n^m \end{bmatrix};$$ [Expression 7]

means for obtaining singular values $\sigma_j$ ($\sigma_1 \geq \sigma_2 \geq \ldots \geq \sigma_r > 0$, where r is equal to a rank of the matrix D) of the matrix B as singular values of the matrix D; means for obtaining singular vectors of the matrix D for $\sigma_1$, $\sigma_2$ and $\sigma_3$; means for computing a matrix E satisfying $E = CC^T$ for a matrix C such that $M = M'C$, where $M' = L'(\Sigma')^{1/2}$, $\Sigma'$ is a 3×3 matrix having $\sigma_1$, $\sigma_2$ and $\sigma_3$ as diagonal elements and the other elements being 0, and L' is a matrix having singular vectors of the matrix D corresponding to $\sigma_1$, $\sigma_2$ and $\sigma_3$ arranged from a left side in this order; means for computing the matrix C from the matrix E; and means for computing the three-dimensional coordinates $s_i$ ($X_i$, $Y_i$, $Z_i$) and the matrix M representing the transformation from the matrix C, wherein the means for obtaining singular vectors of the matrix D for $\sigma_1$, $\sigma_2$ and $\sigma_3$ includes means for performing a Twisted decomposition on a matrix $B^T B - \sigma_j^2 I$ by using a Miura inverse transformation, an sdLVvs transformation, an rdLVvs transformation and a Miura transformation so as to diagonalize a matrix $B^T B$, where I is a unit matrix, thereby the objective described above being achieved.

According to the present invention, an apparatus is provided for searching information relating to a given keyword, the information being included in a given document, the apparatus including: means for receiving query vector q corresponding to the keyword; means for performing an upper bidiagonalization on an index word document matrix D corresponding to the document so as to obtain an upper bidiagonal matrix B of the matrix D; means for obtaining singular values $\sigma_j$ ($\sigma_1 \geq \sigma_2 \geq \ldots \geq \sigma_r > 0$, where r is equal to a rank of the matrix D) of the matrix B as singular values of the matrix D; means for selecting k such that k<r; means for computing an approximate matrix $D_k$ of the matrix D, the matrix $D_k$ being defined as $D_k = U_k \Sigma_k V_k^T$ by using a matrix $\Sigma_k$ having $\sigma_1$, $\sigma_2$, ..., $\sigma_k$ as diagonal elements and the other elements being 0, and left and right orthogonal matrices $U_k$, $V_k$ having only singular vectors corresponding to $\sigma_1$, $\sigma_2$, ..., $\sigma_k$ arranged from a left side in this order; means for computing a similarity between the matrix $D_k$ and the query vector q; and means for outputting a search result based on the computed similarity, wherein the means for obtaining left and right orthogonal matrices $U_k$, $V_k$ of the matrix $D_k$ includes means for performing a Twisted decomposition on a matrix $B^T B - \sigma_j^2 I$ (j=1, 2, ..., k) by using a Miura inverse transformation, an sdLVvs transformation, an rdLVvs transformation and a Miura transformation so as to diagonalize a matrix $B^T B$, where I is a unit matrix, thereby the objective described above being achieved.

According to the present invention, matrix $B^T B$ is diagonalized by performing a Twisted decomposition by using a Miura inverse transformation, an sdLVvs transformation, an rdLVvs transformation and a Miura transformation. Owing to this, when compared to a DSTEGR routine, the present invention is far superior in view of precision, can implement an eigenvalue computation which can endure a practical use and can perform a high-precision singular value decomposition. When the present invention is used with a combination of at least one of an inverse iteration method, a Gram-Schmidt method and a dLVs routine provided in the present invention, the precision of the present invention is sometimes equal to the precision of a DBDSQR routine, yet the present invention can implement an overwhelmingly high-speed singular value decomposition in view of speed. Further, when compared to a DBDSQR routine, the present invention can further reduce an amount of time required for computation in an image restoring problem of two dimensions to three dimensions, a document search problem and the like, both of which will be described later. This reduction of the amount of time required for computation is owing to different computation flows of whether an eigenvalue and an eigenvector are simultaneously obtained or an eigenvector is obtained by using the computed eigenvalue.

BRIEF DESCRIPTION OF THE DRAWINGS

FIG. 12 is a flowchart showing one embodiment of a document search method.

100 computer
1001 CPU
1002 memory 1003 input interface unit
1004 output interface unit
1005 bus

BEST MODE FOR CARRYING OUT THE INVENTION

Hereinafter, embodiments according to the present invention will be described with reference to the accompanying drawings.

1. Singular Value Decomposition Algorithm I-SVD Routine

Figure 1:
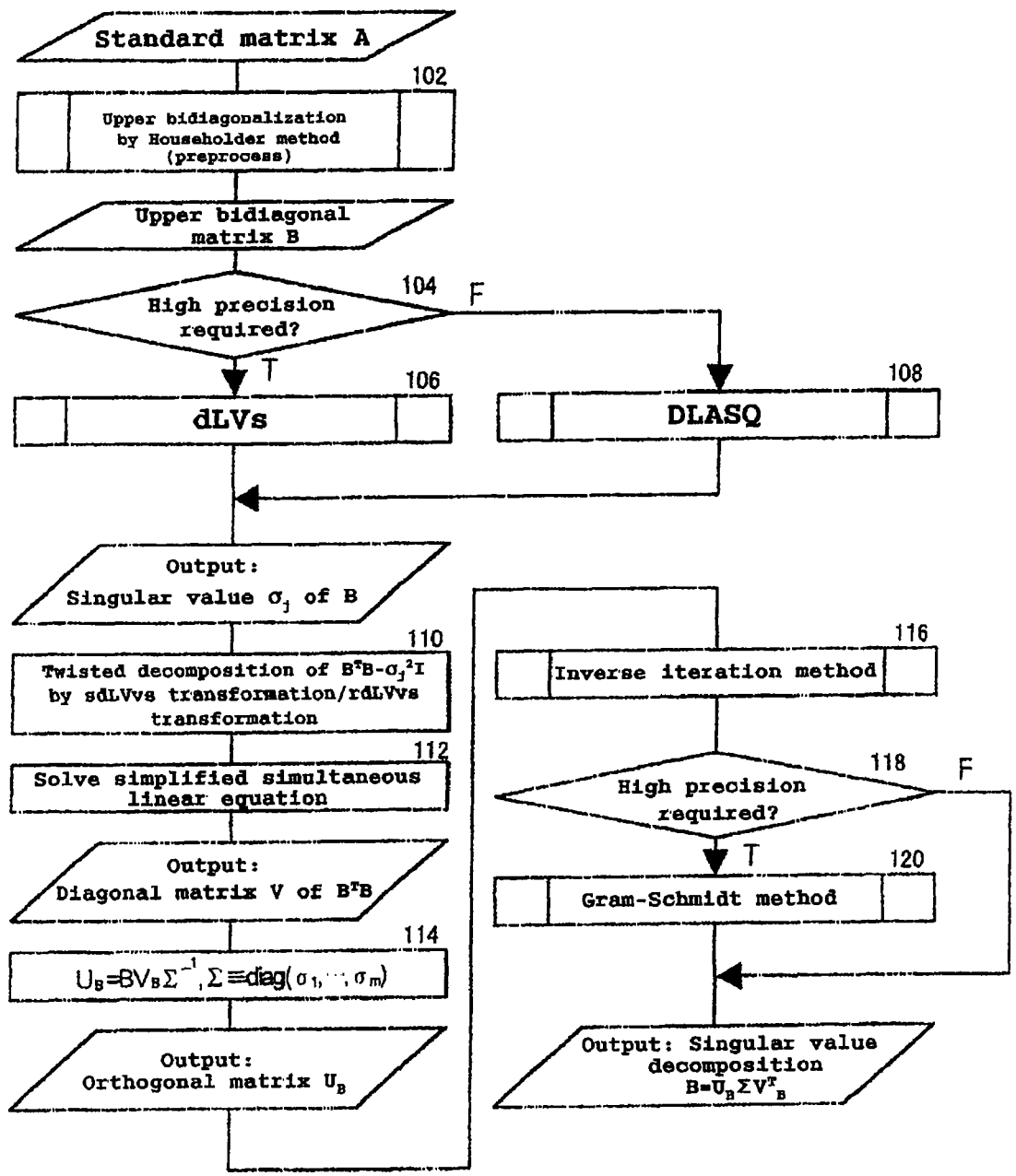
FIG. 1 a flowchart showing a process procedure of an I-SVD routine for a singular value decomposition provided by the present invention.

With reference to FIG. 1, FIG. 1 shows a process procedure of an I-SVD routine for a singular value decomposition provided by the present invention. The process in FIG. 1 is provided in a form of computer program.

In Step 102, standard matrix A is upper-bidiagonalized by using a Householder method. An upper bidiagonalization method used in this case may be a Householder method or may be another upper bidiagonalization method. As a result, upper bidiagonal matrix B is obtained. Next, singular value $\sigma_j$ ($\sigma_1 \geq \sigma_2 \geq \ldots \sigma_m \geq 0$, where m is equal to a matrix size of matrix $B^T B$) of matrix B is computed. Herein, a singular value computation routine dLVs provided by the preset invention and a DLASQ routine provided by LAPACK can be used. A singular value of matrix B is equal to a singular value of matrix A and it is also equal to a positive square root $\lambda_j^{1/2}$ of an eigenvalue of matrix $B^T B$. A dLVs routine computes singular value $\sigma_j$ of B at high precision. A dLVs routine will be described later in detail. Singular values obtained by dLVs have the higher precision when compared to conventional routines (DBDSQR, DLASQ and the like) provided by LAPCK. A dLVs routine is in most cases inferior to a DLASQ routine in view of speed. However, a dLVs routine only requires approximately one half of a computation time needed by a reliable DBDSQR routine (when Itanium2 is used for a CPU, a dLVs routine has the highest speed). In step 104, it is determined whether or not high precision is required. When a highest-precision singular value decomposition is desired, then a dLVs routine is used as a singular value computation routine in step 106. When both high-precision and high-speed are desired for a singular value decomposition, then a conventional DLASQ routine is used as a singular value computation routine in step 108. In addition, although it is not certain if a DLASQ routine stops after a finite number of computations, it is guaranteed that a dLVs routine converges. Thus, if more emphasis is placed on the reliability, then a dLVs routine should be used.

Next, in step 110, computed singular value $\sigma_j$ (i.e., equal to the singular value of A) of B is used to perform a diagonalization of $B^T B$ by a Twisted decomposition using an sdLVvs transformation and an rdLVvs transformation, both of which will be described in 1.1. A diagonalization routine of matrix $B^T B$ according to the present invention will be described in detail in 1.1. Further, in step 112, when a simplified simultaneous linear equation which will be described in detail in 1.1, $$N_{k_0}^T v_j = e_{k_0}, \; e_{k_0} \equiv \left( \underbrace{0, \ldots, 0}_{(k_0-1)}, 1, 0, \ldots, 0 \right)^T \quad \text{[Expression 8]}$$

is obtained, singular vector $v_j$ of matrix B (i.e., diagonal matrix V of $B^T B$) is obtained. In other words, $B^T B$ is diagonalized. In step 114, when $\Sigma = \text{diag}(\sigma_1, \sigma_2, \ldots, \sigma_m)$ (where $\sigma_1 \geq \sigma_2 \geq \ldots \geq \sigma_m > 0$), right orthogonal matrix $V_B$ of matrix B=V. Thus, $U_B$ is obtained from left orthogonal matrix $U_B$ of matrix $B = B V_B \Sigma^{-1} = B V \Sigma^{-1}$. In other words, matrix B is singular-value decomposed. Herein, all m number of singular values and singular vectors are computed. However, this principle can be applied to a case when at least one singular value and singular vector are computed.

Precision of the left and right orthogonal matrices obtained in this case, i.e., the result of the singular vector computation, is inferior to that of the result obtained by a DBDSQR routine. Accordingly, in step 116, an inverse iteration method is used, so that precision equal to that of a DBDSQR routine can be obtained. In the case where further precision is required, a re-orthogonalization is performed by Gram-Schmidt method in step 120, so that the computation having higher precision than a DBDSQR can be implemented. It is appreciated from Table 2 that the computation speed of an I-SVD routine is significantly reduced compared to a DBDSQR. Also, it is appreciated from Table 1, an I-SVD routine can perform a singular value decomposition at high precision even in the case where the precision of DSTEGR extremely deteriorates. Data about error and computation time shown in Tables 1 and 2 are a result obtained by using the inverse iteration method, not Gram-Schmidt method. In addition, steps 116 and 120 can be performed in the opposite order. Alternatively, both of the steps can be omitted.

As described above, the functionality of each step shown in FIG. 1 is implemented by software (e.g., program). However, the present invention is not limited to this. The functionality of each step shown in FIG. 1 can be implemented by hardware (e.g., circuit, board and semiconductor chip). Alternatively, the functionality of each step shown in FIG. 1 can be implemented by a combination of software and hardware.

As described above, by using an I-SVD routine, it is possible to perform a higher-speed and higher-precision singular value decomposition than a conventional technique.

Table 1 shows a comparison in terms of error between the present invention and the conventional technique when a matrix $B^T B$ diagonalization routine according to the present invention is performed and thereafter the inverse iteration method is performed.

TABLE 1

Error evaluation

|  | I-SVD (Including dLVs) | DBDSQR | DSTEGR |
|---|---|---|---|
| $\|B - U\Sigma V^T\|_\infty$ | 1.69E−13 | 1.31E−13 | 4.40E+04 |
| $\|U^T U - I\|_\infty$ | 2.09E−13 | 1.26E−13 | — |
| $\|V^T V - I\|_\infty$ | 4.16E−13 | 1.21E−13 | 2.04E+04 |

Table 2 shows a comparison in terms of computation time between the present invention and the conventional technique when a matrix $B^T B$ diagonalization routine according to the present invention is performed and thereafter the inverse iteration method is performed.

TABLE 2

Computation time (sec)

| Matrix size | I-SVD (Inluding dLVs) | DBDSQR | DSTEGR |
|---|---|---|---|
| 1000 | 1.12 | 56.85 | 0.20 |
| 2000 | 4.88 | 1175.34 | 0.84 |
| 3000 | 11.84 | 4879.39 | 1.78 |

Further, 1.3 will describe the reason why the method according to the present invention can alleviate the error when compared to a DSTEGR routine.

1.1 Diagonalization Routine of Matrix $B^T B$ According to the Present Invention A DBDSQR can simultaneously obtain eigenvalue $\lambda_j$ and its corresponding eigenvector $v_j$ of $B^T B$. Thus, diagonalization of $B^T B$ (singular value decomposition of B) can be obtained without a combination of another routine. However, DLASQ and dLVs do not include the functionality of computing eigenvector $v_j$, as described above. Accordingly, another computation routine for eigenvector is required. However, herein, it is assumed that eigenvalue $\lambda_j$ of $B^T B$ (singular value $\sigma_j$ of B) has been previously obtained.

First, a method for computing eigenvectors by using DSTEGR will be shown. Parlett and et al. show that a computation for eigenvectors can be performed in the following order of (1), (2) and (3).

(1) A Cholesky decomposition $(B^{(\pm 1)})^T B^{(\pm 1)} = (B^{(0)})^T B^{(0)} - \lambda_j I$ of $(B^{(0)})^T B^{(0)} - \lambda_j I$ using a stationary qd with shift transformation (stqds transformation) and a reverse-time progressive qd with shift transformation (rpqds transformation) is obtained, where $B^{(0)} = B$, and $B^{(+1)}$ and $B^{(-1)}$ are upper bidiagonal matrix and lower bidiagonal matrix, respectively. In other words, $$B^{(\pm 1)} \equiv \begin{pmatrix} b_1^{(\pm 1)} & b_2^{(\pm 1)} & & & \\ & b_3^{(\pm 1)} & \ddots & & \\ & & \ddots & b_{2m-2}^{(\pm 1)} & \\ & & & & b_{2m-1}^{(\pm 1)} \end{pmatrix}$$ [Expression 9]

$$B^{(-1)} \equiv \begin{pmatrix} b_1^{(-1)} & & & & \\ b_2^{(-1)} & b_3^{(-1)} & & & \\ & \ddots & \ddots & & \\ & & & b_{2m-2}^{(n)} & b_{2m-1}^{(n)} \end{pmatrix}$$

$$b_{2k-1}^{(n)} \equiv \xi_k^{(n)} \sqrt{q_k^{(n)}}, \; b_{2k}^{(n)} \equiv \eta_k^{(n)} \sqrt{e_k^{(n)}}$$

$$(\xi_k^{(n)})^2 = 1, \; (\eta_k^{(n)})^2 = 1$$

$$\xi_k^{(1)} \eta_k^{(1)} = \xi_k^{(0)} \eta_k^{(0)}, \; \xi_{k+1}^{(-1)} \eta_k^{(-1)} = \xi_k^{(0)} \eta_k^{(0)}$$

In other words, $\{q_k^{(\pm 1)}, e_k^{(\pm 1)}\}$ is computed.

(2) A Twisted Decomposition $$N_{k_0} D_{k_0} N_{k_0}^T = (B^{(0)})^T B^{(0)} - \lambda_k I$$ [Expression 10]

of $(B^{(0)})^T B^{(0)} - \lambda_k I$ is formed from a Cholesky decomposition, where $$N_k \equiv \begin{pmatrix} 1 & & & & & & \\ L_1^{(1)} & 1 & & & & & \\ & \ddots & \ddots & & & & \\ & & L_{k-1}^{(1)} & 1 & U_k^{(-1)} & & \\ & & & & 1 & \ddots & \\ & & & & & \ddots & U_{m-1}^{(-1)} \\ & & & & & & 1 \end{pmatrix}$$ [Expression 11]

$$D_k \equiv diag(q_1^{(1)}, \ldots, q_{k-1}^{(1)}, 1, q_k^{(-1)}, \ldots, q_m^{(-1)}),$$

$$L_k^{(1)} \equiv \sqrt{e_k^{(1)}/q_k^{(1)}}, \; U_k^{(-1)} \equiv \sqrt{e_k^{(-1)}/q_{k+1}^{(-1)}}$$

and $k = k_0$ when $\gamma_k \equiv q_k^{(1)} + q_k^{(-1)} - (e_{k-1}^{(0)} + q_k^{(0)} - \lambda_k)$ is minimized.

(3) Simplified Simultaneous Linear Equation $$N_{k_0}^T v_j = e_{k_0}, \; e_{k_0} \equiv \left( \underbrace{0, \ldots, 0}_{(k_0 - 1)}, 1, 0, \ldots, 0 \right)^T$$ [Expression 12]

is solved.

Figure 2:
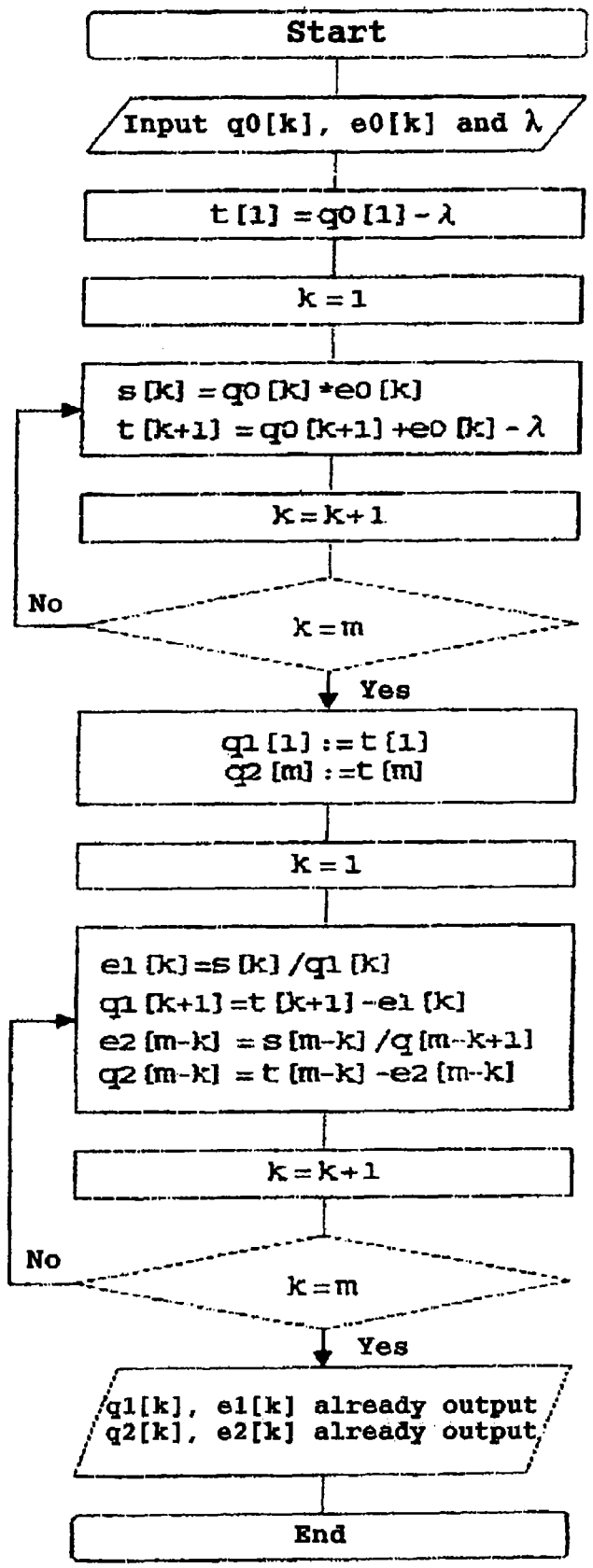
FIG. 2 is a flowchart showing a process procedure of an stqds transformation and an rpqds transformation in the method by Parlett and et al.
Figure 3:
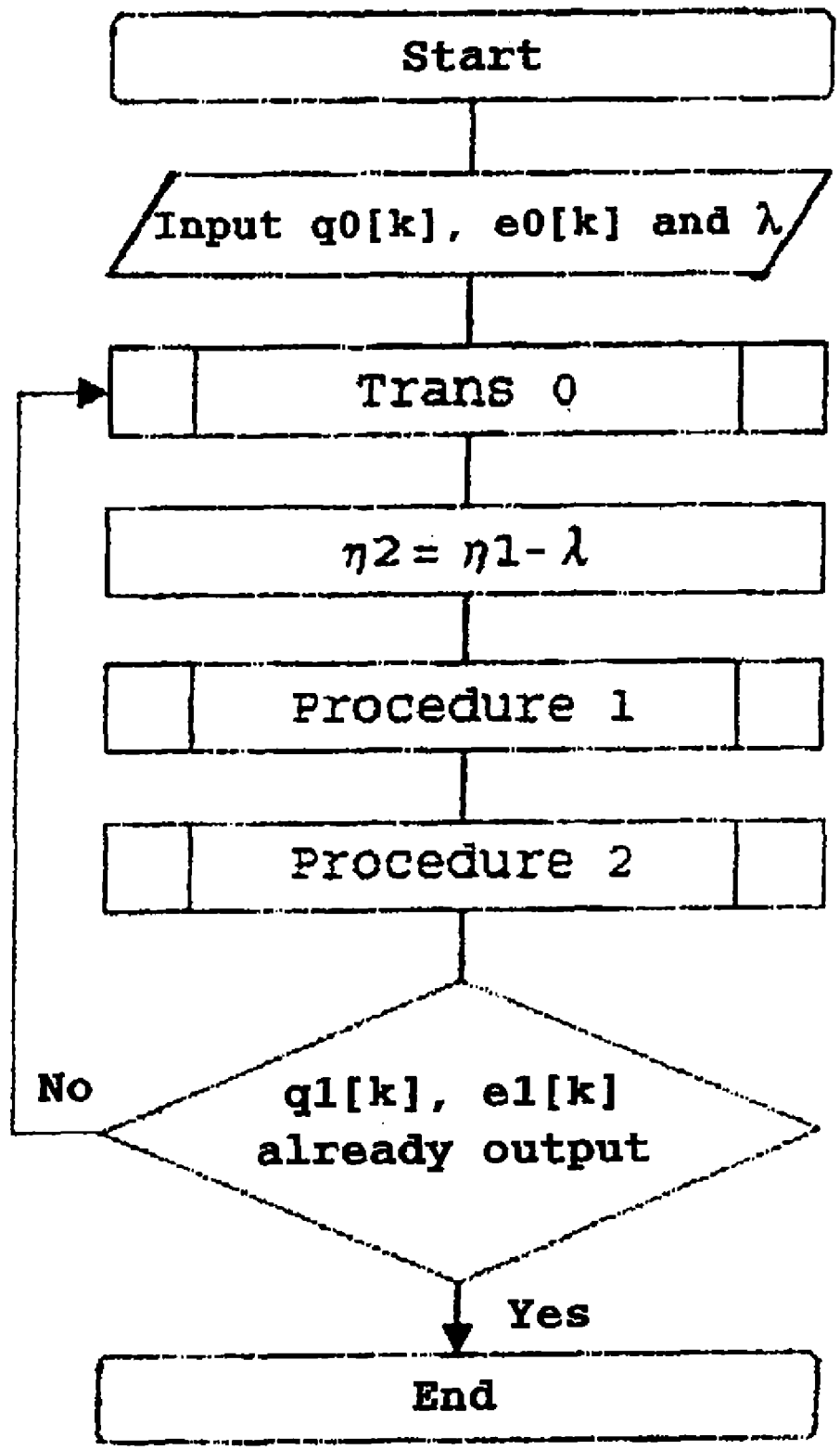
FIG. 3 is a flowchart showing a process procedure of a Miura inverse transformation, an sdLVvs transformation, an rdLVvs transformation and a Miura transformation according to the present invention.
Figure 4:
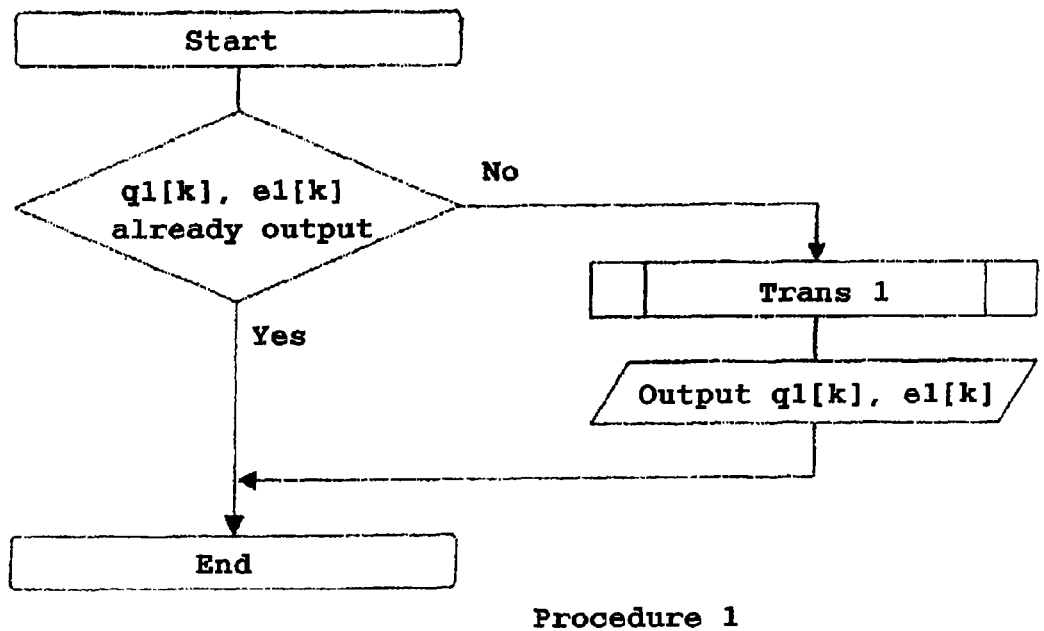
FIG. 4 is a flowchart showing a process procedure of a Miura inverse transformation, an sdLVvs transformation, an rdLVvs transformation and a Miura transformation according to the present invention.
Figure 5:
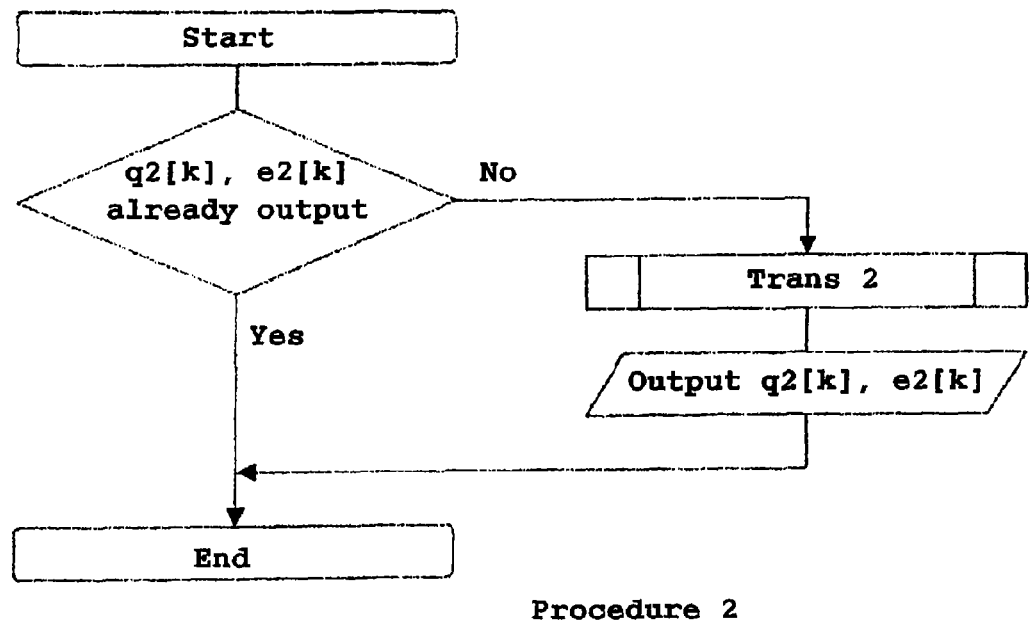
FIG. 5 is a flowchart showing a process procedure of a Miura inverse transformation, an sdLVvs transformation, an rdLVvs transformation and a Miura transformation according to the present invention.
Figure 6:
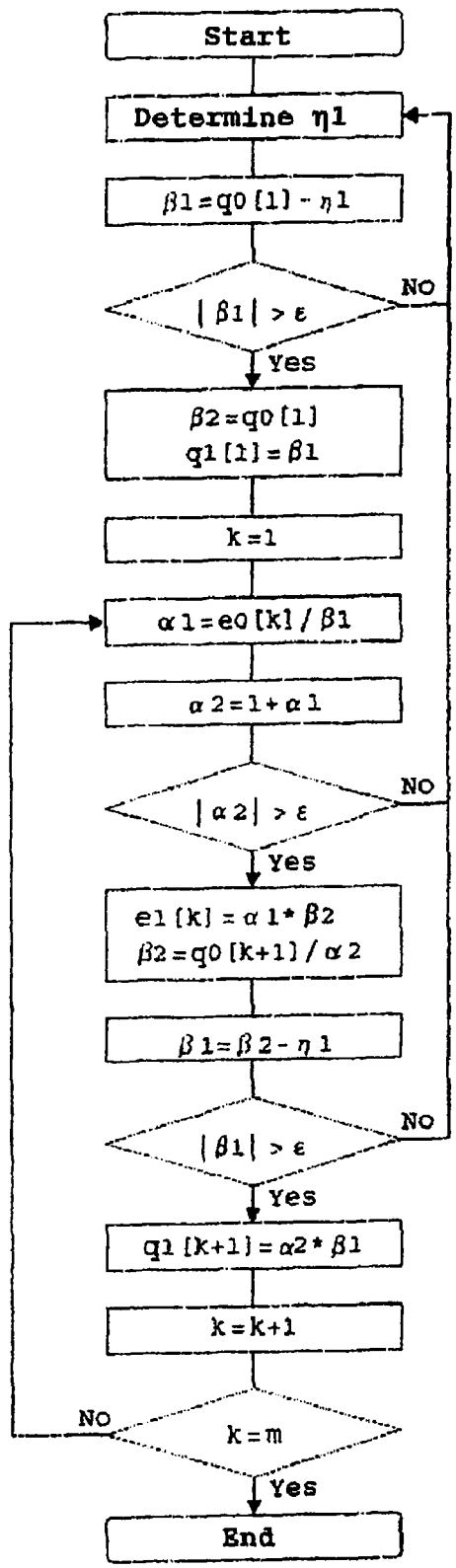
FIG. 6 is a flowchart showing a process procedure of a Miura inverse transformation, an sdLVvs transformation, an rdLVvs transformation and a Miura transformation according to the present invention.
Figure 7:
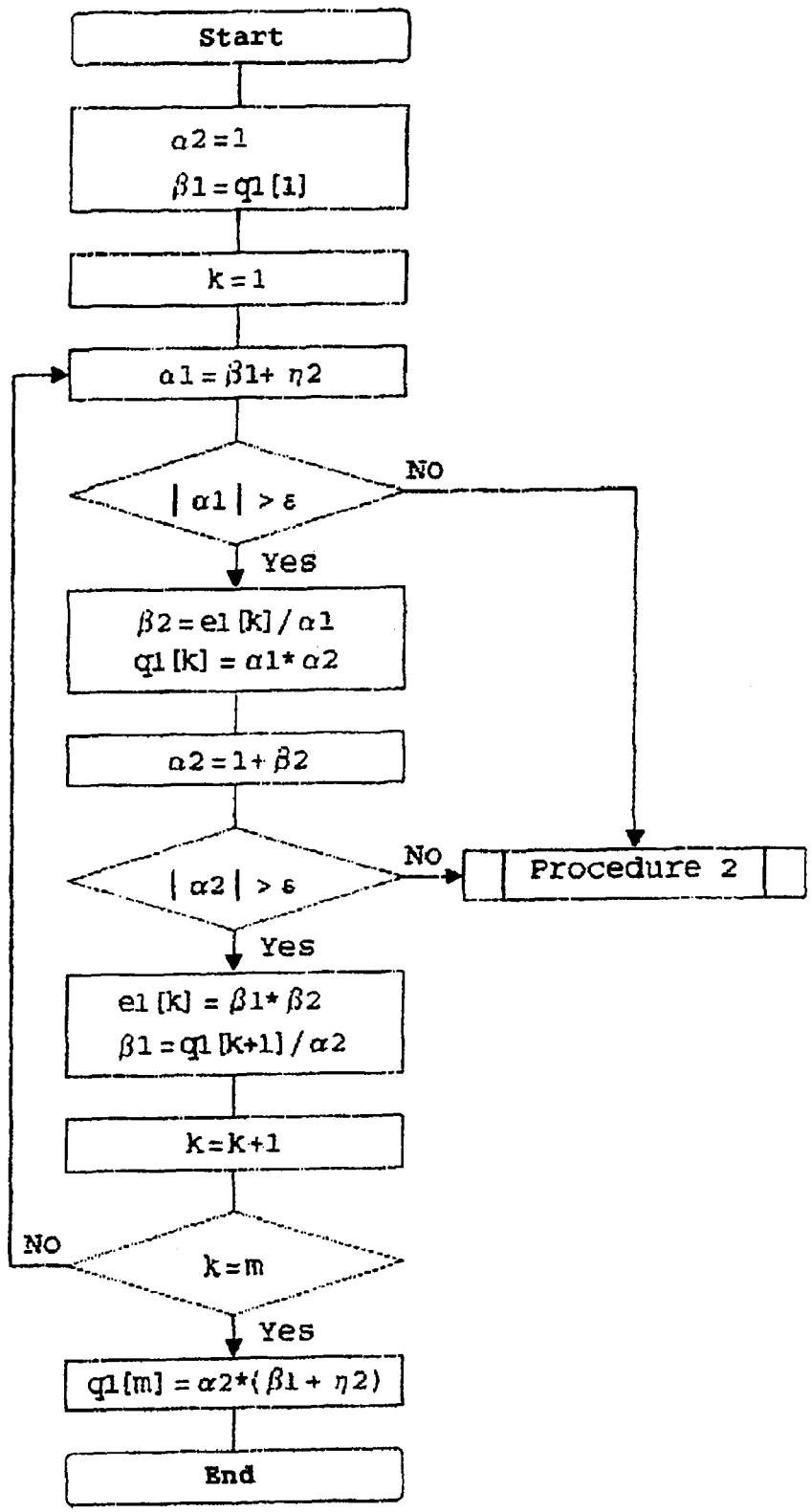
FIG. 7 is a flowchart showing a process procedure of a Miura inverse transformation, an sdLVvs transformation, an rdLVvs transformation and a Miura transformation according to the present invention.
Figure 8:
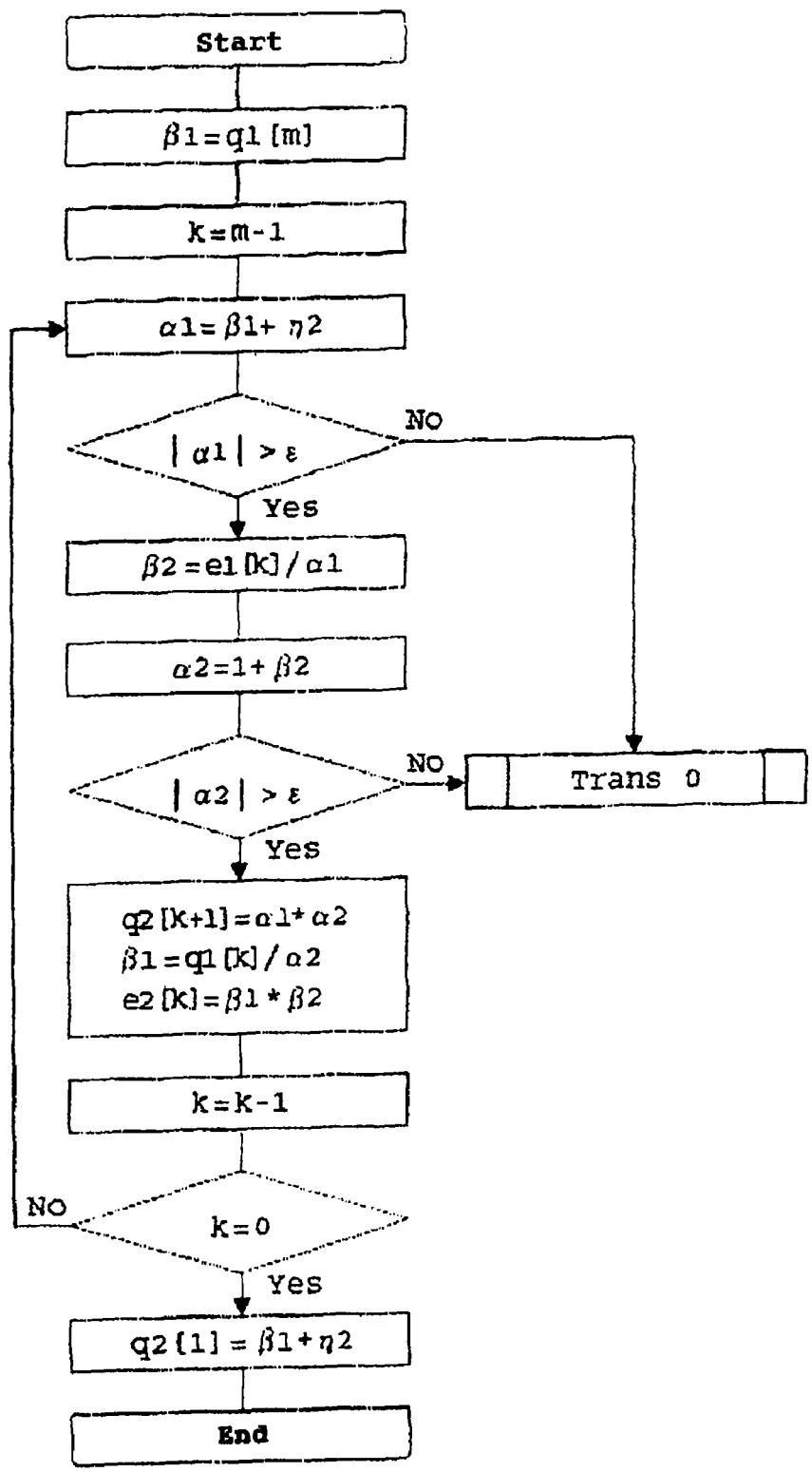
FIG. 8 is a flowchart showing a process procedure of a Miura inverse transformation, an sdLVvs transformation, an rdLVvs transformation and a Miura transformation according to the present invention.

FIG. 2 shows a process procedure of (1), which is the core of the method by Parlett and et al. In order to obtain $\{q_k^{(1)}, e_k^{(1)}\}$ (where $n = \pm 1$) in (1), a stationary qd with shift (stqds) transformation $$q_k^{(1)} + e_{k-1}^{(1)} = q_k^{(0)} + e_{k-1}^{(0)} - \lambda_j, \; k = 1, 2, \ldots, m,$$

$$q_k^{(1)} e_k^{(1)} = q_k^{(0)} e_k^{(0)}, \; k = 1, 2, \ldots, m-1,$$

$$e_0^{(0)} \equiv 0, e_0^{(1)} \equiv 0,$$

and a reverse-time progressive qd with shift (rpqds) transformation $$q_k^{(-1)} + e_k^{(-1)} = q_k^{(0)} + e_{k-1}^{(0)} - \lambda_j, \; k = 1, 2, \ldots, m,$$

$$q_k^{(-1)} e_k^{(-1)} = q_k^{(0)} e_k^{(0)}, \; k = 1, 2, \ldots, m-1,$$

$$e_0^{(0)} \equiv 0, e_0^{(1)} \equiv 0,$$

are employed.

When eigenvalue $\lambda_j$ is previously known, a repetitive computation is not required. Thus, an amount to be computed is overwhelmingly smaller than that of QR algorithm. However, an stqds transformation and an rpqds transformation are not always good in terms of numerical stability and precision. There is a possibility that a cancellation error resulting from subtraction may occur in both an stqds transformation and an rpqds transformation. For example, in an stqds transformation, if $q_k^{(0)} + e_{k-1}^{(0)} - \lambda_j \sim e_{k-1}^{(1)}$, when $q_k^{(1)} (= q_k^{(0)} + e_{k-1}^{(0)} - \lambda_j - e_{k-1}^{(1)})$ is obtained, there is a case in which a significant digit of $q_k^{(1)}$ results in only one digit even when a double-precision computation is employed. In such a case, when $q_k^{(0)} e_k^{(0)} / q_k^{(1)}$ is computed, an error occurs. In other words, $e_k^{(1)}$ cannot be computed with high precision. In addition, a sequential computation is required (i.e., $e_k^{(1)}$ is required in order to obtain $q_{k+1}^{(1)}$ and $q_k^{(1)}$ is required in order to obtain $e_k^{(1)}$). Thus, there is a possibility that an error due to cancellation error occurred during one computation spreads, which further aggravates the error. As a result, although $q_k^{(1)} \neq 0$ in theory, $q_k^{(1)} = 0$ due to an error accumulation. It is expected that a situation of numerical instability (e.g., overflow) in computation of $q_k^{(0)} e_k^{(0)} / q_k^{(1)}$ may occur.

When $B^{(0)} = \text{component}\{b_{2k-1}^{(0)}, b_{2k}^{(0)}\}$ of B is given (i.e., $\{q_k^{(0)}, e_k^{(0)}\}$ is given), $\lambda_j$ and $e_{k-1}^{(1)}$ are uniquely determined. Thus, there is no way to avoid this situation of numerical instability. Since an rpqds transformation has a similar property to that of an stqds transformation, it is not considered that an rpqds transformation has reached a practical level. A FORTRAN implemented DSTEGR routine is published as an improved version in LAPACk, which, however, does not completely solve the aforementioned defect.

Next, a diagonalization routine according to the present invention will be described. The routine according to the present invention employs a new transformation instead of an stqds transformation and an rpqds transformation. In the present invention, in order to diagonalize matrix $B^T B$, a Twisted decomposition using an sdLVvs transformation and an rdLVvs transformation is performed on matrix $B^T B - \sigma_j^2 I$. To be precise, the aforementioned (1) is divided into the following three steps (1a), (1b) and (1c). As a result, a Cholesky decomposition with numerical stability is implemented.

FIGS. 3 to 8 show a process procedure for performing a Miura inverse transformation, an sdLVvs transformation, an rdLVvs transformation and a Miura transformation according to the present invention.

(1a) A Miura Inverse Transformation $$\{q_k^{(0)}, e_k^{(0)}\} \mapsto \{u_{2k-1}^{(0)}, u_{2k}^{(0)}\}$$ [Expression 13]

is performed.

$$u_{2k-1}^{(0)} = \eta^{(0)} t_k^{(0)}, k=1,2\ldots,m$$

$$u_{2k}^{(0)} = e_k^{(0)}/t_k^{(0)}, k=1,2,\ldots,m-1,$$

$$t_k^{(0)} = q_k^{(0)}/(\eta^{(0)} + u_{2k-2}^{(0)}) - 1, \eta^{(0)} = 1/\delta^{(0)}$$

where $\delta^{(0)}$ can be arbitrarily selected.

(1b) By a Non-Uniform Stationary Discrete Lotka-Volterra (sdLVvs) Transformation $$u_k^{(1)} = u_k^{(0)} * (1+\delta^{(0)} u_{k-1}^{(0)})/(1+\delta^{(1)} u_{k-1}^{(1)}), k=1,2,\ldots,2m-1,$$

$$u_k^{(0)} \mapsto u_k^{(1)}$$ [Expression 14]

and by a non-uniform reverse-time discrete Lotka-Volterra (rdLVvs) transformation $$u_k^{(-1)} = u_k^{(0)} * (1+\delta^{(0)} u_{k-1}^{(0)})/(1+\delta^{(-1)} u_{k+1}^{(-1)}), k=1,2,\ldots,2m-1,$$

$$u_k^{(0)} \mapsto u_k^{(-1)}$$ [Expression 15]

are performed, where $u_0^{(n)} \equiv 0$, $u_{2m}^{(0)} \equiv 0$, and $\delta^{(n)}$ (where $n=\pm 1$) is set such that $\lambda_j = 1/\delta^{(0)} - 1/\delta^{(n)}$ is satisfied (where $n=\pm 1$).

(1c) A Miura Transformation $$\{u_{2k-1}^{(n)}, u_{2k}^{(n)}\} \mapsto \{q_k^{(n)}, e_k^{(n)}\}, n=\pm 1$$ [Expression 16]

$$q_k^{(n)} = \eta^{(n)} * (1+\delta^{(n)} u_{2k-2}^{(n)}) * (1+\delta^{(n)} u_{2k-1}^{(n)}),$$

$k=1,2,\ldots,m,$ $$e_k^{(n)} = \delta^{(n)} * u_{2k-1}^{(n)} * u_{2k}^{(n)}$$

$k=1,2,\ldots,m-1$ is performed.

A significant feature of a discrete Lotka-Volterra transformation, which is not seen in a qd transformation, is that discrete Lotka-Volterra can have an arbitrary parameter. In other words, a value of $\delta^{(n)}$ can be arbitrarily set within a range which satisfies $\lambda_j = 1/\delta^{(0)} - 1/\delta^{(\pm 1)}$. When $\delta^{(n)}$ is fluctuated, then a value of an auxiliary variable $u^k_{(n)}$ also varies. However, it can be determined beforehand whether or not an error and numerical instability caused by a cancellation error occurs. This determination can be implemented by an "if" clause. In this case, a computation is performed again after $\delta^{(n)}$ is re-set. In addition, when $u_k^{(\pm 1)}$ is obtained, $q_k^{(\pm 1)}$ and $e_k^{(\pm 1)}$ are independently computed by a Miura transformation. Accordingly, this determination has a property that an error does not propagate. A Miura inverse transformation can be called a Miura transformation, and, vice versa, a Miura transformation can be called a Miura inverse transformation. An sdLVvs transformation can be called an stLVv transformation, and, vice versa, an rdLVv transformation can be called an rLVv transformation.

Correspondence between variables of input and output is the same as that of the method by Parlett. In order to suppress memory consumption, it is not necessary to prepare an array for auxiliary variable $u_k^{(n)}$. On the other hand, a memory area for $1+\delta^{(0)} u^{(0)}$ is secured, and this value is used throughout steps (1a) to (1c). As a result, the memory consumption can be suppressed and an amount to be computed can be reduced, thereby alleviating the error. Accordingly, further contrivance, for example, alleviation of error by utilizing a method to be described in 1.3, can be created.

After a Cholesky decomposition of $B^T B - \lambda_j I$ is obtained by using the method described above, singular value $v_j$ is computed by using the same method as that employed by Parlett and et al. Accordingly, eigenvalue decomposition $\Lambda$ of $B^T B = V_B^T B^T B V_B$ is obtained (where column vector of $V_B$ is $v_j$). When $U_B$ is obtained from $U_B = BV_B \Sigma^{-1}$, then singular value decomposition $B = U_B \Sigma V_B^T$ of B can also be obtained.

1.2. High Precision Singular Value Computation dLVs Routine

A dLVs routine according to the present invention is the same as a DLASQ routine in a basic framework. Only eigenvalues of $B^T B$ (or singular values of B) can be obtained, and eigenvectors of $B^T B$ (or singular vectors of B) can not be obtained. However, a computation method used as the core in a dLVs routine is different from that of a DLASQ routine.

First, a method for computing eigenvalues using a DLASQ routine will be described. Although a qd method can not compute eigenvectors, it can obtain singular values at high speed since one step of a qd method only updates an element of upper bidiagonal matrix. Further, a high-precision computation is expected since an amount to be computed is small, and therefore an accumulation of rounding errors is suppressed. Herein, it is assumed that $Y^{(n)}$ is a symmetric tridiagonal matrix $$Y^{(n)} = \begin{pmatrix} q_1^{(n)2} & q_1^{(n)} e_1^{(n)} & & 0 \\ q_1^{(n)} e_1^{(n)} & q_2^{(n)2} + e_1^{(n)2} & \ddots & \\ & \ddots & \ddots & q_{m-1}^{(n)} e_{m-1}^{(n)} \\ 0 & & q_{m-1}^{(n)} e_{m-1}^{(n)} & q_m^{(n)2} + e_{m-1}^{(n)2} \end{pmatrix}$$ [Expression 17]

In addition, it is assumed that transformation $Y^{(n)} \to Y^{(n+1)}$ is implemented by a recursive equation of qd method:

$$q_k^{(n+1)} = q_k^{(n)} + e_k^{(n)} - e_{k-1}^{(n+1)}, k=1,2,\ldots,m,$$

$$e_k^{(n+1)} = e_k^{(n)} * q_{k+1}^{(n)}/q_k^{(n+1)}, k=1,2,\ldots,m-1,$$

$$e_0^{(n)} \equiv 0, e_m^{(n)} \equiv 0, n=0,1,\ldots$$

In this case, Rutishauser found that an appropriate $R^{(n)}$ is present, and therefore $Y^{(n+1)} = R^{(n)} Y^{(n)} (R^{(n)})^{-1}$. This means that $Y^{(n+1)}$ and $Y^{(n)}$ have the same eigenvalue. In other words, an eigenvalue preserving deformation is performed by the aforementioned recursive equation. It has been proved that when this deformation is repeatedly performed, non-diagonal elements approach to 0, and thus $Y^{(n)}$ is diagonalized. Accordingly, when $Y^{(0)} = B^T B$, $\lim_{n \to \infty} Y^{(n)} = \text{diag}(\lambda_1, \lambda_2, \ldots, \lambda_m)$ (where $\lambda_k$ is an eigenvalue of $B^T B$). Further, singular value $\sigma_k$ of B is obtained when a positive square root of $\lambda_k$ is computed.

In a singular value computation routine DLASQ in LAPCAK, a differential version of qd method is employed. This is called dqd method. One step is given by $$d := q_1^{(n)}$$

for $k := 1, m-1$ $$q_k^{(n+1)} := d + e_k^{(n)}$$

$$e_k^{(n+1)} := e_k^{(n)} * (q_{k+1}^{(n)}/q_k^{(n+1)})$$

$$d := d * (q_{k+1}^{(n)}/q_k^{(n+1)})$$

end for $$q_m^{(n+1)} := d,\quad\quad\text{[Expression 18]}$$

and transformation $Y^{(n)} \to Y^{(n+1)}$ is implemented. Since this differential version does not include a subtraction, there is no concern regarding an error cancellation, which may occur in a qd method. Further, as a high speed version, a dqd method with datum shift (dqds) is incorporated in this differential version. Thus, it is possible to suppress an occurrence of a rounding error owing to the high speed at which the process is performed, thereby reducing an amount to be computed. However, there is no guarantee that a dqd method with datum shift (dqds) converges. One step of datum shift version is given by $$d := q_1^{(n)} - s$$

for $k := 1, m-1$ $$q_k^{(n+1)} := d + e_k^{(n)}$$

$$e_k^{(n+1)} := e_k^{(n)} * (q_{k+1}^{(n)}/q_k^{(n+1)})$$

$$d := d * (q_{k+1}^{(n)}/q_k^{(n+1)}) - s$$

end for $$q_m^{(n+1)} := d,\quad\quad\text{[Expression 19]}$$

where s is an amount of datum shift and is the minimum eigenvalue of $Y^{(n)}$ estimated by Gersgorin type boundary condition. Therefore, in the core of a main loop of a DLASQ routine, the minimum eigenvalue is estimated. If $s > \epsilon$ ($\epsilon$: positive number regarded as an extremely small number), a dqds method is used. Otherwise, a dqd method is used. The other parts of the main loop (division/reduction of the dimension of matrix) of a DLASQ routine are substantially the same as those of a DBDSQR routine. In other words, a QR method included in a DBDSQR routine is replaced with a dqd method and a datum shift QR method is replaced with a dqds method, resulting in a DLASQ routine (since a QR method and a dqd method, and a datum shift QR method and a dqds method deal with different variables, respectively, there are parts which employ slightly different criterion equations. However, the different criterion equations are essentially the same).

Next, a dLVs routine according to the present invention will be described. In this dLVs routine, a dLV method is employed instead of a dqd method, and a dLVs method is employed instead of a dqds method. Herein, it is guaranteed that a dLVs routine converges, which is different from a DLASQ routine. One step is given by as follows:

$$u_1^{(n)} := w_1^{(n)}$$

for $k := 2, 2m-1$ $$u_k^{(n)} := w_k^{(n)}/(1+\delta^{(n)} * u_{k-1}^{(n)});\ v_{k-1}^{(n)} := u_{k-1}^{(n)} * (1+\delta^{(n)} * u_k^{(n)});$$

end for $$v_{2m-1}^{(n)} := u_{2m-1}^{(n)}$$

(Determination of Datum Shift s)

if $(s > \epsilon) w_1^{(n+1)} := v_1^{(n)} - s;$ for $k = 2, m$ $$w_{2k-2}^{(n+1)} := v_{2k-2}^{(n)} * v_{2k-3}^{(n)}/w_{2k-3}^{(n+1)};\ w_{2k-1}^{(n+1)} := v_{2k-1}^{(n)} + v_{2k-2}^{(n)} - w_{2k-2}^{(n+1)} - s;$$

end for end if else for $k = 1, 2m-1$ $$w_k^{(n+1)} := v_k^{(n)}$$

end for end else

Similar to a DLASQ routine, the core of a main loop of a dLVs routine determines a datum shift amount s by estimating the minimum singular value and then determines whether it uses a dLV method or a dLVs method. However, a dLVs routine is different from a DLASQ routine in that the datum shift amount s is determined after auxiliary variable $v_k^{(n)}$ is obtained.

1.3. Alleviation of Error According to the Present Invention

If a person can compute in an ideal situation, i.e., can compute infinite number of digits as much as possible, then either the method by Parlett and et al. or the singular vector computation routine according to the present invention (see 1.1) can be used. However, it must be careful when a computation is executed by a computer. In a computer which can only compute finite digits, even if a mathematically correct method is used, a correct result can not always be obtained. Moreover, there are cases in which a numerical problem (e.g., computation does not finish no matter how long it computes) occurs.

Regarding an error caused by a computer computation, a rounding error, cancellation error and the like are known. The rounding error individually only has a different value from a true value at the last digit and therefore it does not cause an enormous error. Although a rounding error still occurs when at least one computation from addition, multiplication and division is performed on two real numbers having different exponential parts. However, no error greater than that occurs. Further, even if such an operation causing the rounding error is repeated, a round-up or a round-down is automatically performed if a rounding mode uses "near" (rounding). Therefore, the error does not significantly accumulate. Accordingly, in many methods for computing numerical values, it is not often to pay special attention to the rounding error caused by at least one of addition, multiplication and division. The rounding error eventually does not uniformly increase in a singular value computation by a dLVs routine.

The problem is a cancellation error resulting from a subtraction of real numbers having the same sign and an addition of real numbers having different signs. After a value becomes 0 due to the cancellation error and then when a division is performed with 0, 0 becomes the denominator, which is an irregular form. Therefore, it is impossible to perform a computation. In such a situation, the computation will not finish no matter how long it computes. A computation of subtraction→division exists in both methods employed by Parlett and the present invention. Therefore, it is necessary to pay enough attention to the cancellation error.

In the computation method according to the present invention, it is possible to determine whether or not the computation method according to the present invention contains the error caused by the aforementioned cancellation error by checking if the value obtained by the subtraction is small. In the case of Parlett method, q1[k] and q2[k] in DO clause in FIG. 2 are checked in order to determine if a computation method by Parlett contains the cancellation error. However, even if it is determined that the cancellation error is contained in the computation method by Parlett, there is no way to avoid the cancellation error. The reason for this is because when {q0[k], e0[k]} is given as an initial value, λ is uniquely determined, and {q1[k], e1[k]} and {q2[k], e2[k]} are also uniquely derived. In other words, the computation method by Parlett is a computation method which does not have any arbitrarily parameter, which means no degree of freedom.

Figure 9:
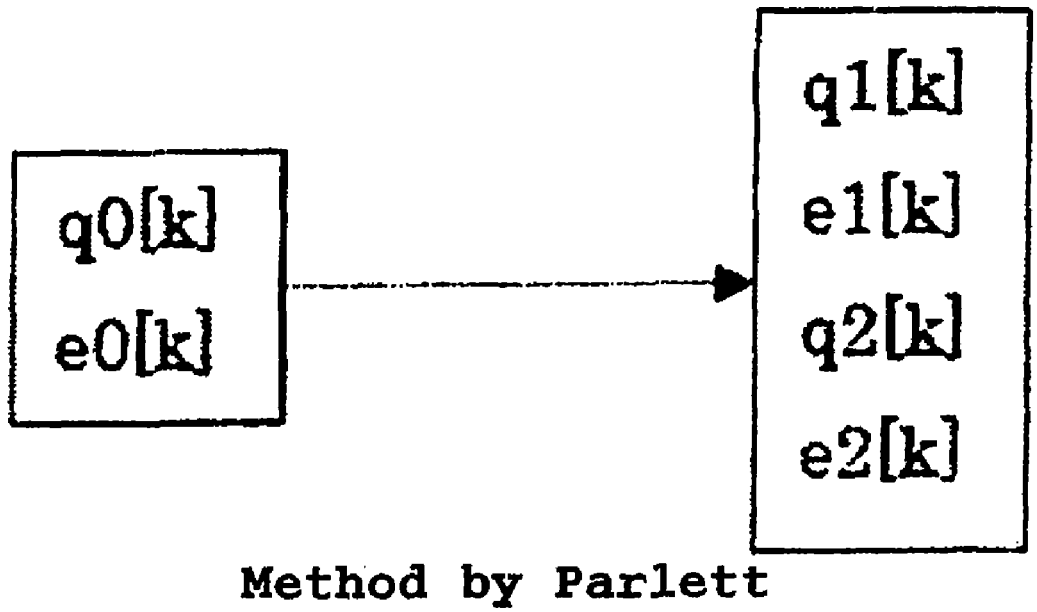
FIG. 9 is a diagram showing the difference in computation routes between the method by Parlett and the present invention, which alleviates an error.
Figure 9:
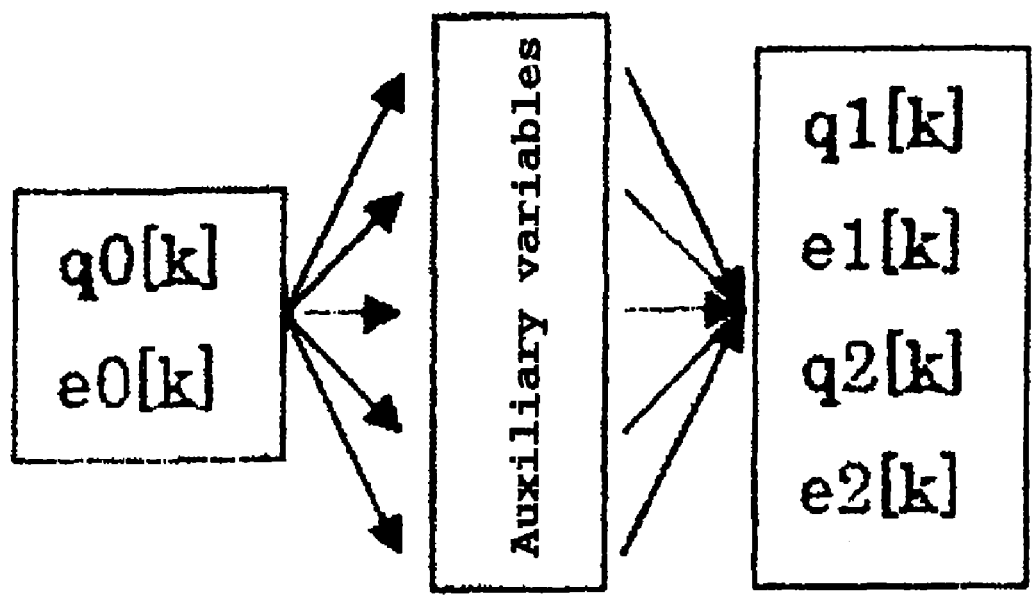

In contrast, the computation method according to the present invention has parameter η1 ($=1/\delta^{(0)}$) which can be freely set. Thus, a value of auxiliary variable $u_k^{(n)}$ can be changed in various ways (see FIG. 9). In other words, {q1[k], e1[k]} and {q2[k], e2[k]} can be computed in various routes. Accordingly, it is possible to avoid a case when a cancellation error occurs. Influence of the cancellation error is checked by condition criterion in FIGS. 6 to 8 and if the absolute value of a value obtained by the subtraction does not satisfy a condition that the absolute value is greater than a small number E, then the process goes back to the setting of parameter η1. This process is repeatedly performed until the above condition is satisfied. In the case where more emphasis is placed on high speed than precision, if the condition is not satisfied by several number of repetitions (q1[k]=0 or q2[k]=0), an exception process can be performed.

2. Singular Value Decomposition Apparatus According to the Present Invention

An apparatus for performing a singular value decomposition will be described. The apparatus for performing the singular value decomposition is, for example, an apparatus having the function of each step shown in FIG. 1. One embodiment of apparatus for performing the singular value decomposition is a computer for performing a singular value decomposition program. This program is, for example, a program causing the CPU to execute each step shown in FIG. 1.

Figure 10:
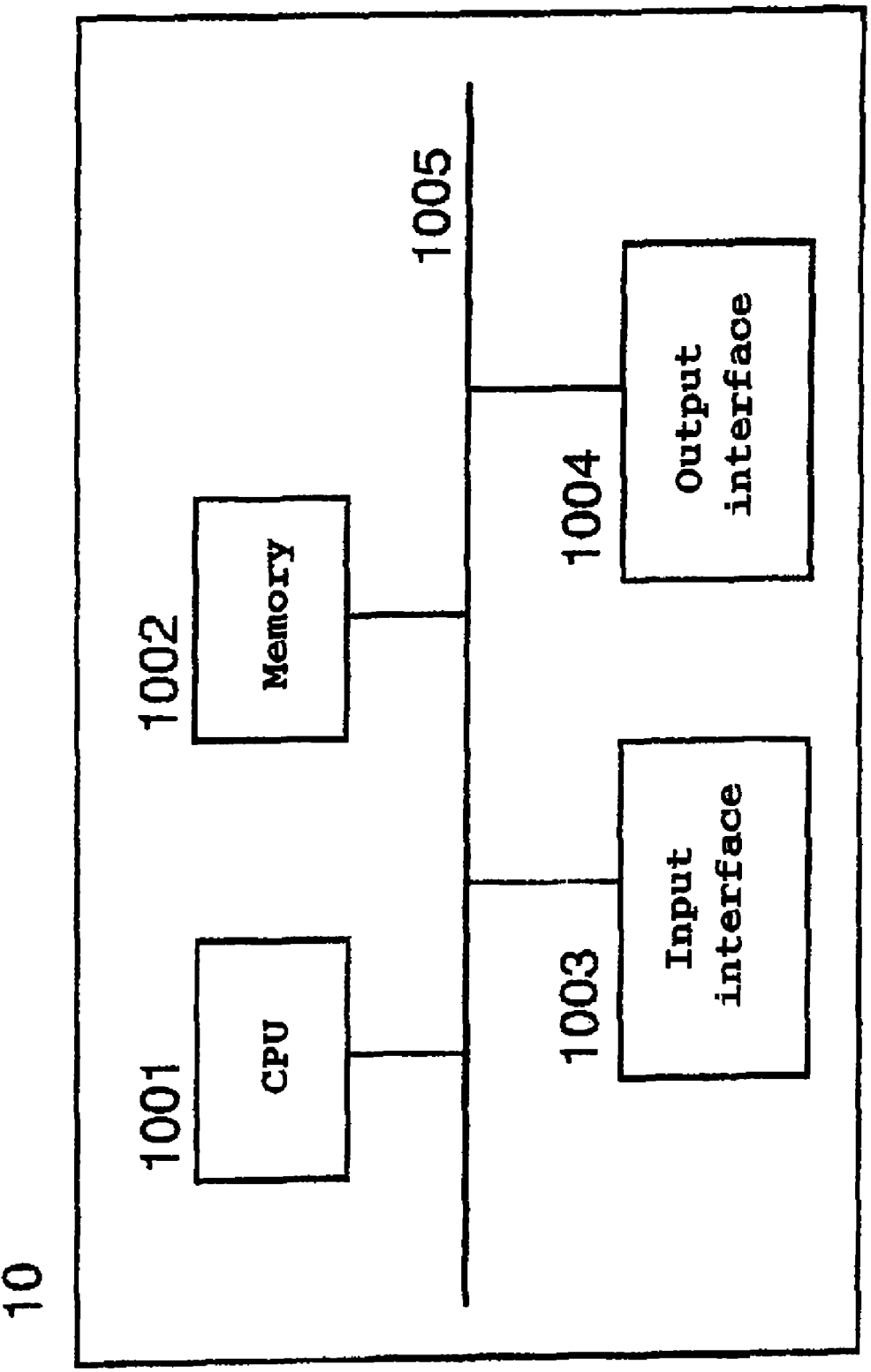
FIG. 10 is a diagram showing a computer, which is one embodiment of a singular value decomposition apparatus according to the present invention.

FIG. 10 shows a computer 10 for performing the process in FIG. 1 as a computer program. The computer 10 includes a CPU 1001, a memory 1002, an input interface unit 1003, an output interface unit 1004 and a bus 1005.

The CPU 1001 executes a program. This program is, for example, a program for executing the process in FIG. 1. The program and data required to execute the program are, for example, stored in the memory 1002. The program can be included in the memory 1002 in an arbitrary manner. For example, when the memory 1002 is a writable memory, a program can be loaded from outside the computer 1002 and stored in the memory 1002. Alternatively, when the memory 1002 is a read-only memory, the program is burned and stored in the memory 1002.

Further, the input interface unit 1003 functions as an interface for receiving, from outside, matrix A targeted for a singular value decomposition. The output interface unit 1004 functions as an interface for outputting a computation result. The bus 1005 is used to connect components 1001 to 1004 in the computer 10 to each other.

3. Application of Singular Value Decomposition Method According to the Present Invention The singular value decomposition method according to the present invention can be applied to various fields. Examples thereof are shown below, in which the singular value decomposition according to the present invention is applied to an image process for restoring a three-dimensional image from two-dimensional images and is also applied to a document search. However, these two exemplary applications are merely examples. Accordingly, the application of the singular value decomposition method according to the present invention is not limited to these two exemplary applications. The application of the singular value decomposition method according to the present invention is applicable to any field which uses a singular value decomposition.

Figure 11:
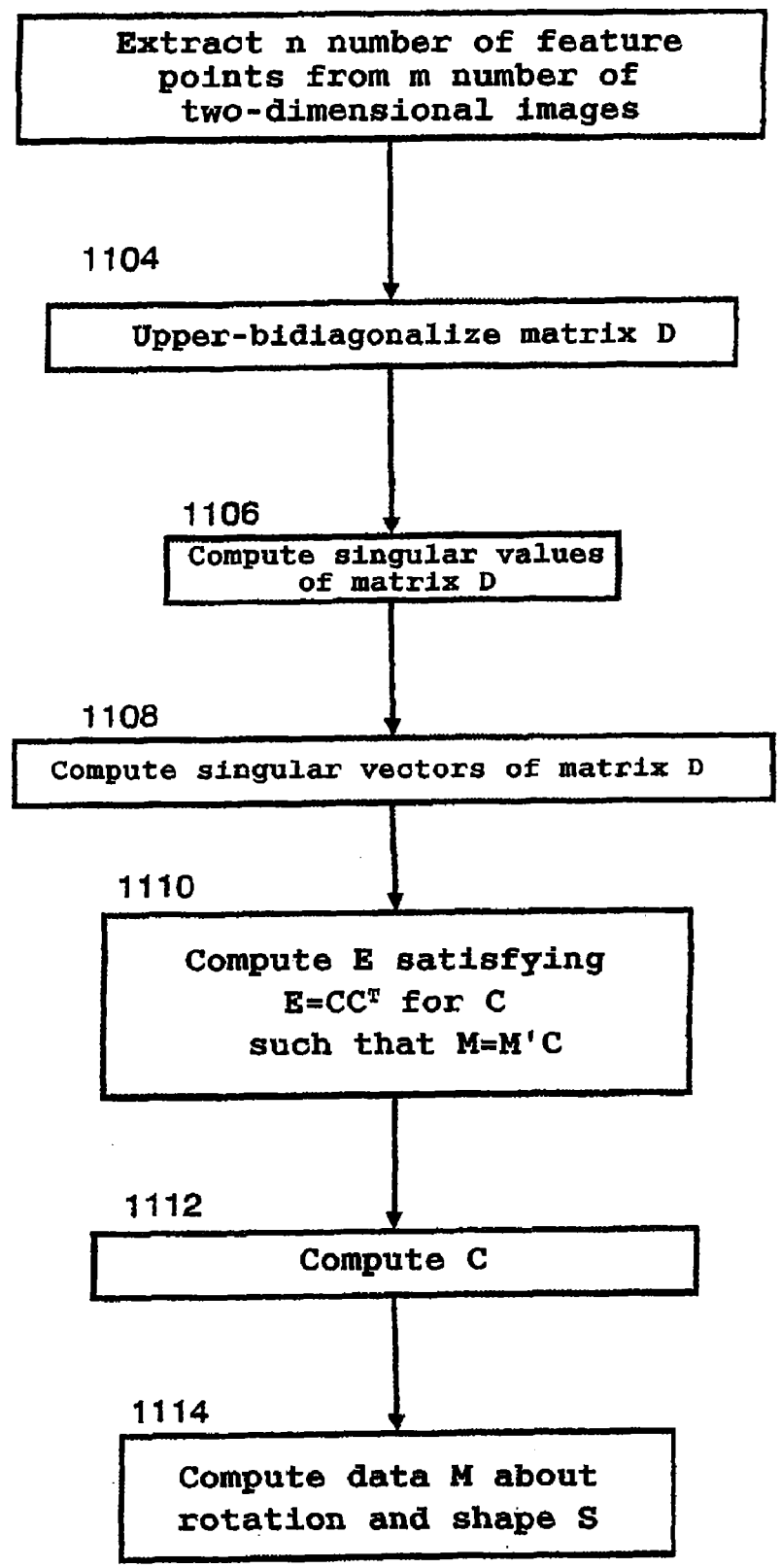
FIG. 11 is a flowchart showing one embodiment of an image process for restoring a three-dimensional image from a plurality of two-dimensional images of an object using the singular value decomposition apparatus according to the present invention.

3.1 Application to Image Process for Restoring Three-Dimensional Image from Two-Dimensional Images With reference to FIG. 11, FIG. 11 describes an embodiment of an image process using the singular value decomposition method according to the present invention. This image process restores a three-dimensional image from a plurality of two-dimensional images of an object.

A step required in order to restore a three-dimensional image from a plurality of two-dimensional images includes: a step of extracting feature points from the two-dimensional images; a step of computing data about shape (three-dimensional coordinate data for the feature points of an original object) and rotation (transformation from three-dimensional data to feature point data) based on the feature point data; and a step of performing a visualization based on the data about the shape and the rotation.

In step 1102, coordinates ($x_i^j$, $y_i^j$) of feature point (i=1, . . . , n, where n is an integer greater than or equal to 2) are extracted from two-dimensional image j (j=1, . . . , m, where m is an integer greater than or equal to 3). It is preferable that two-dimensional images to be handled are weak central projection images. In such a case, $$\begin{bmatrix} x_i^j \\ y_i^j \end{bmatrix} = s_j \begin{bmatrix} r_{1,j}^T \\ r_{2,j}^T \end{bmatrix} \begin{bmatrix} X_i \\ Y_i \\ Z_i \end{bmatrix} \qquad \text{[Expression 21]}$$

is established, where $s_j$ is a scale of j-th image relative to a scale of the object; $r_{1,j}$, $r_{2,j}$ are respectively 1st and 2nd row vectors of a rotation matrix in j-th camera coordinate system relative to an object coordinate system, and $[X_i, Y_i, Z_i]^T$ are three-dimensional coordinates for i-th point. The scale of the object is the same as the scale of the 1st image ($s_1=1$). The position of the coordinate system of the object is the same as that of a camera coordinate system of the 1st image ($r_{1,1}=[1, 0,0]^T$, $r_{2,1}=[0,1,0]^T$). When coordinates for all n number of points in all m number of images are arranged as elements of matrix D, D=MS is obtained, where $$D = \begin{bmatrix} x_1^1 & \ldots & x_i^1 & \ldots & x_n^1 \\ \ldots & \ldots & \ldots & \ldots & \ldots \\ x_1^j & \ldots & x_i^j & \ldots & x_n^j \\ \ldots & \ldots & \ldots & \ldots & \ldots \\ x_1^m & \ldots & x_i^m & \ldots & x_n^m \\ y_1^1 & \ldots & y_i^1 & \ldots & y_n^1 \\ \ldots & \ldots & \ldots & \ldots & \ldots \\ y_1^j & \ldots & y_i^j & \ldots & y_n^j \\ \ldots & \ldots & \ldots & \ldots & \ldots \\ y_1^m & \ldots & y_i^m & \ldots & y_n^m \end{bmatrix}, \qquad \text{[Expression 22]}$$

$$M = \begin{bmatrix} s_1 r_{1,1}^T \\ \vdots \\ s_j r_{1,j}^T \\ \vdots \\ s_m r_{1,m}^T \\ s_1 r_{2,1}^T \\ \vdots \\ s_j r_{2,j}^T \\ \vdots \\ s_m r_{2,m}^T \end{bmatrix}$$

$$S = \begin{bmatrix} X_1 & \ldots & X_i & \ldots & X_n \\ Y_1 & \ldots & Y_i & \ldots & Y_n \\ Z_1 & \ldots & Z_i & \ldots & Z_n \end{bmatrix}$$

As can be appreciated from M and S, the rank of D is 3. Currently, D is given in step 1102. Hereinafter, data M about the rotation and shape S will be obtained.

A singular value decomposition of matrix D, $D=U\Sigma V^T$, will be considered, where $\Sigma$ has singular values arranged in a diagonal line in the order of size, and U and V are left orthogonal matrix and right orthogonal matrix, respectively. In step 1104, in order to compute the singular value decomposition of matrix D, matrix D is upper-bidiagonalized so as to obtain upper bidiagonal matrix B. In step 1106, matrix B, i.e., the singular value of D, is computed. In step 1106, a dLVs routine according to the present invention, a DLASQ routine or another singular value computation routine may be used. Alternatively, a combination thereof may be used. In this case, three or more singular values other than 0 are obtained due to a digital error of an image. However, a fourth singular value and its subsequent singular values result from noise. Thus, those singular values are significantly smaller than the first three singular values.

In step 1108, singular vectors for the first three singular values are computed. Step 1108 can employ steps 110 to 120 in FIG. 1. The three vectors used are appended together, so that the following expression is obtained.

$$D' = L'\Sigma' R'^T = M'S'$$

where $M'=L'(\Sigma')^{1/2}$, $S'=(\Sigma')^{1/2}R'^T$, and D' is a matrix with rank 3 and minimizes $\|D-D'\|$.

Next, it is intended to obtain M and S from D'. However, the combination thereof is not unique. The reason for this is because an arbitrary non-singular matrix satisfies $$D'=(M'C)(C^{-1}S')$$

Thus, C in the above expression is determined such that M=M'C. C satisfies the following expression;

$$MM^T = M'CC^T M'^T \quad \text{[Expression 23]}$$

$$= \begin{bmatrix} 1 & \ldots & \ldots & 0 & \ldots & \ldots \\ \vdots & \ddots & \vdots & \vdots & \ddots & \vdots \\ \ldots & \ldots & s_m^2 & \ldots & \ldots & 0 \\ 0 & \ldots & \ldots & 1 & \ldots & \ldots \\ \vdots & \ddots & \vdots & \vdots & \ddots & \vdots \\ \ldots & \ldots & 0 & \ldots & \ldots & s_m^2 \end{bmatrix}$$

When $E=CC^T$, 2m+1 number of linear equations are obtained from the above expression. 2m+1 relates to six elements of E. Since $m \geq 3$, the elements of E can be uniquely determined. In step 1110, matrix E is obtained.

Next, step 1112, C is obtained from E. Degree of freedom (9) of C is greater than degree of freedom (6) of E. Condition $r_{1j}=[1,0,0]^T$, $r_{2j}=[0,1,0]^T$ are added, so that C can be determined. In this case, two solutions (Necker Reversal) are obtained.

Next, in step 1114, data M about the rotation and shape S are determined based on M=M'C and $S=C^{-1}S'$.

A DBDSQR routine obtains U, V (n number of vectors) as described above and thereafter employs three vectors (n-3 number of vectors is unnecessary). In principle, herein, a DBDSQR obtains n number of vectors. However, a DBDSQR can obtain less than n number of vectors in an exceptional case. In this embodiment, only three vectors have to be obtained, which subsequently results in a reduction of a computation cost.

3.2 Document Search Method Using Singular Value Decomposition Method According to the Present Invention After the process of extracting an index word relating to the contents of a document from the document and computing a weight of the index word, the document is represented in a vector space model by using a vector having the weight of the index word as an element. It is assumed that documents targeted for search are denoted as $D_1, D_2, \ldots, D_n$ and there are m number of index words $w_1, w_2, \ldots, w_m$ in total throughout the entire document sets. In this case, document $D_j$ is represented with the following vector, which is called document vector.

$$d_j = \begin{bmatrix} d_{1j} \\ d_{2j} \\ \vdots \\ d_{mj} \end{bmatrix} \quad \text{[Expression 24]}$$

where $d_{ij}$ is a weight in document $D_j$ having index word $w_i$. The entire document sets can be represented with the following m×n matrix D.

$$D = [d_1 \quad d_2 \quad \ldots \quad d_n] \quad \text{[Expression 25]}$$

$$= \begin{bmatrix} d_{11} & d_{12} & \ldots & d_{1n} \\ d_{21} & d_{22} & \ldots & d_{2n} \\ \vdots & \vdots & \ddots & \vdots \\ d_{m1} & d_{m2} & \ldots & d_{mn} \end{bmatrix}$$

Matrix D is called index word document matrix. Each column of the index word document matrix is a document vector representing information about a document. In a similar manner, each row of the index word document matrix is a vector representing information about an index word, which is called index word vector. A search query can be represented, in a similar manner to the document, with a vector having a weight of index word as an element. When a weight of index word $w_i$ contained in a search query clause is denoted as $q_i$, search query vector q is represented as follows;

$$q = \begin{bmatrix} q_1 \\ q_2 \\ \vdots \\ q_m \end{bmatrix}$$ [Expression 26]

In an actual document search, it is necessary to find a document similar to a given search query clause. This is performed by computing the similarity between search query vector q and each document vector $d_j$. Various criteria are considered as a definition of the similarity between vectors. The definition which is often used in a document search is cosine measure (angle between two vectors) or inner product.

Cosine measure [Expression 27]

$$\cos(d_j, q) = \frac{d_j \cdot q}{\|d_j\|\|q\|}$$

$$= \frac{\sum_{i=1}^{m} d_{ij} q_i}{\sqrt{\sum_{i=1}^{m} d_{ij}^2} \sqrt{\sum_{i=1}^{m} q_i^2}}$$

Inner product $$d_j \cdot q = \sum_{i=1}^{m} d_{ij} q_i$$

When the length of the vector is normalized to 1 (cosine normalization), the cosine measure matches the inner product.

With reference to FIG. 12, FIG. 12 describes one embodiment of a document search method using the singular value decomposition apparatus according to the present invention.

In step 1202, query vector q is received. Next, in step 1204, in order to compute the singular value decomposition of matrix D, matrix D is upper-bidiagonalized so as to obtain upper bidiagonal matrix B. In step 1206, matrix B, i.e., the singular value of D, is computed. In step 1206, a dLVs routine according to the present invention, a DLASQ routine or another singular value computation routine may be used. Alternatively, a combination thereof may be used.

Next, a search using approximate matrix $D_k$ of D will be considered. In the vector space model, a search is performed by computing the similarity between search query vector q and each document vector $d_j$ in index word document matrix D. Herein, $D_k$ is used instead of D. In the vector space model, the number of dimensions of document vectors equals to the total number of index words. Accordingly, as the number of documents targeted for search increases, the number of dimensions of document vectors tends to increase. However, not only does the increase of the number of dimensions cause problems, such as a restraint by a memory in a computer and an increase of search time, but also unnecessary index words contained in a document will have noise influence, which results in a phenomenon of reducing search precision. Latent semantic indexing (LSI) is a technique which is intended to improve the search precision by projecting a document vector in a higher dimensional space into a lower dimensional space. Index words which are treated separately in the higher dimensional space is possibly treated as having relevancy to each other in the lower dimensional space. Thus, a search can be performed based on the meaning or concept of the index word. For example, in a normal vector space model, index word "car" and index word "automobile" are totally different from each other. Accordingly, it is not possible to search a document having one of the index words by a query including the other index word. However, since it is expected that index words semantically related to each other are degenerated to one dimension in the lower dimensional space, it is possible to search a document including "automobile" as well as a document including "car", by the search query "car". The latent semantic indexing reduces dimensions of a higher dimensional vector by a singular value decomposition, which is basically equivalent to a principal component analysis in a multivariable analysis.

In step 1208, a value of k is selected such that k<r. The value of k can be previously given. Alternatively, the value of k can be selected at each computation.

In step 1210, singular vectors of D are computed for k number of singular values (from the largest singular value to k-th singular value in the order of size) of the singular values computed in step 1206. In other words, $U_k$ and $V_k$ which satisfy $$D_k = U_k \Sigma V_k^T$$

are computed. Herein, $U_k$ is m×k matrix only including first k number of left singular vectors, $V_k$ is n×k matrix only including first k number of right singular vectors, and $\Sigma$ is k×k diagonal matrix only including first k number of singular values. Step 1210 can employ steps 110 to 120 in FIG. 1.

Next, in step 1212, the similarity between matrix $D_k$ and query vector q is computed. When it is assumed that vector $e_j$ is a unit vector of n dimensions, j-th document vector of $D_k$ can be represented with $D_k e_j$. The computation of the similarity between document vector $D_k e_j$ and search query vector q is defined as:

$$\cos(D_k e_j, q) = \frac{(D_k e_j) \cdot q}{\|D_k e_j\|\|q\|}$$ [Expression 28]

$$= \frac{(D_k e_j)^T q}{\|D_k e_j\|\|q\|}$$

$$= \frac{\left(U_k \sum_k V_k^T e_j\right)^T q}{\|U_k \sum_k V_k^T e_j\|\|q\|}$$

$$= \frac{e_j^T V_k \sum_k U_k^T q}{\|\sum_k V_k^T e_j\|\|q\|}$$

$$= \frac{\left(\sum_k V_k^T e_j\right)^T (U_k^T q)}{\|\sum_k V_k^T e_j\|\|q\|}$$

Alternatively, another definition can be used. The above expression shows that it is not necessary to re-construct $D_k$ from $U_k$, $\Sigma_k$ and $V_k$. Instead, it shows that the similarity can be directly computed from a result of a singular value decomposition. $\Sigma_k V_k^T e_j$ denoted in expression 28 can be rewritten as $\Sigma_k V_k^T e_j = U_k^T D_k e_j$. The right side of this expression represents coordinates (k dimensional representation of the document) using base $U_k$ of j-th document vector in approximate matrix $D_k$. Similarly, $U_k^T q$ in expression 28 are coordinates (k dimensional representation of the search query) using base $U_k$ of search query vector q.

In step 1214, a search result is output based on the similarity computed in step 1212.

A DBDSQR routine obtains r number of vectors and thereafter employs k number of vectors (r-k number of vectors is unnecessary). In contrast, in this embodiment, only k number of vectors has to be obtained, which subsequently results in a reduction of a computation cost.

As described above, the present invention is exemplified by the use of its preferred embodiments. However, the present invention should not be interpreted solely based on embodiments described above. It is understood that the scope of the present invention should be interpreted solely based on the claims. It is also understood that those skilled in the art can implement equivalent scope of technique, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention is useful as a method, program, apparatus and the like capable of performing a high-speed and high-precision singular value decomposition on arbitrary matrix A.

The invention claimed is:

1. A method for restoring a three-dimensional image from a plurality of two-dimensional images of an object, the method comprising the steps of:

extracting coordinates $d_{ij}$ ($x_{ij}$, $y_{ij}$) of feature points i (i= 1, ..., n, where n is an integer greater than or equal to 2) in two-dimensional images j (j=1, ..., m, where m is an integer greater than or equal to 3); and computing three-dimensional coordinates $s_i$ ($X_i$, $Y_i$, $Z_i$) of the feature points and a matrix M representing a transformation from two-dimensional coordinates to three-dimensional coordinates based on the two-dimensional coordinates $d_{ij}$ ($x_{ij}$, $y_{ij}$) of the feature points, wherein the step of computing three-dimensional coordinates $s_i$ ($X_i$, $Y_i$, $Z_i$) of the feature points and a matrix M representing a transformation from two-dimensional coordinates to three-dimensional coordinates includes the steps of:

performing an upper bidiagonalization on a matrix D so as to obtain an upper bidiagonal matrix B of the matrix D, the matrix D being defined as $$D = \begin{bmatrix} x_1^1 & \cdots & x_i^1 & \cdots & x_n^1 \\ \cdots & \cdots & \cdots & \cdots & \cdots \\ x_1^j & \cdots & x_i^j & \cdots & x_n^j \\ \cdots & \cdots & \cdots & \cdots & \cdots \\ x_1^m & \cdots & x_i^m & \cdots & x_n^m \\ y_1^1 & \cdots & y_i^1 & \cdots & y_n^1 \\ \cdots & \cdots & \cdots & \cdots & \cdots \\ y_1^j & \cdots & y_i^j & \cdots & y_n^j \\ \cdots & \cdots & \cdots & \cdots & \cdots \\ y_1^m & \cdots & y_i^m & \cdots & y_n^m \end{bmatrix};$$  [Expression 1]

obtaining singular values $\sigma_j$ ($\sigma_1 \geq \sigma_2 \geq \ldots \geq \sigma_r > 0$, where r is equal to a rank of the matrix D) of the matrix B as singular values of the matrix D;

obtaining singular vectors of the matrix D for $\sigma_1$, $\sigma_2$ and $\sigma_3$;

computing a matrix E satisfying $E = CC^T$ for a matrix C such that $M = M'C$, where $M' = L'(\Sigma')^{1/2}$, $\Sigma'$ is a 3×3 matrix having $\sigma_1$, $\sigma_2$ and $\sigma_3$ as diagonal elements and the other elements being 0, and L' is a matrix having singular vectors of the matrix D corresponding to $\sigma_1$, $\sigma_2$ and $\sigma_3$ arranged from a left side in this order;

computing the matrix C from the matrix E; and computing the three-dimensional coordinates $s_i$ ($X_i$, $Y_i$, $Z_i$) and the matrix M representing the transformation from the matrix C, wherein the step of obtaining singular vectors of the matrix D for $\sigma_1$, $\sigma_2$ and $\sigma_3$ includes a step of performing a Twisted decomposition on a matrix $B^T B - \sigma_j^2 I$ by using a Miura inverse transformation, an sdLVvs transformation, an rdLVvs transformation and a Miura transformation so as to diagonalize a matrix $B^T B$, where I is a unit matrix.

2. A method for searching information relating to a given keyword, the information being included in a given document, the method comprising the steps of:

receiving query vector q corresponding to the keyword;

performing an upper bidiagonalization on an index word document matrix D corresponding to the document so as to obtain an upper bidiagonal matrix B of the matrix D;

obtaining singular values $\sigma_j$ ($\sigma_1 \geq \sigma_2 \geq \ldots \geq \sigma_r > 0$, where r is equal to a rank of the matrix D) of the matrix B as singular values of the matrix D;

selecting k such that k<r;

computing an approximate matrix $D_k$ of the matrix D, the matrix $D_k$ being defined as $D_k = U_k \Sigma_k V_k^T$ by using a matrix $\Sigma_k$ having $\sigma_1, \sigma_2, \ldots, \sigma_k$ as diagonal elements and the other elements being 0, and left and right orthogonal matrices $U_k$, $V_k$ having only singular vectors corresponding to $\sigma_1, \sigma_2, \ldots, \sigma_k$ arranged from a left side in this order;

computing a similarity between the matrix $D_k$ and the query vector q; and outputting a search result based on the computed similarity, wherein the step of obtaining left and right orthogonal matrices $U_k$, $V_k$ of a matrix $D_k$ includes a step of performing a Twisted decomposition on a matrix $B^T B - \sigma_j^2 I$ (j=1, 2, ..., k) by using a Miura inverse transformation, an sdLVvs transformation, an rdLVvs transformation and a Miura transformation so as to diagonalize a matrix $B^T B$, where I is a unit matrix.

3. A non-transitory computer readable medium storing a program for causing a computer to execute an image restoring process for restoring a three-dimensional image from a plurality of two-dimensional images of an object, the image restoring process including the steps of:
- extracting coordinates $d_{ij}$ ($x_{ij}$, $y_{ij}$) of feature points i (i= 1, ..., n, where n is an integer greater than or equal to 2) in two-dimensional images j (j=1, ..., m, where m is an integer greater than or equal to 3); and
- computing three-dimensional coordinates $s_i$ ($X_i$, $Y_i$, $Z_i$) of the feature points and a matrix M representing a transformation from two-dimensional coordinates to three-dimensional coordinates based on the two-dimensional coordinates $d_{ij}$ ($x_{ij}$, $y_{ij}$) of the feature points, wherein
the step of computing three-dimensional coordinates $s_i$ ($X_i$, $Y_i$, $Z_i$) of the feature points and a matrix M representing a transformation from two-dimensional coordinates to three-dimensional coordinates includes the steps of:
- performing an upper bidiagonalization on a matrix D so as to obtain an upper bidiagonal matrix B of the matrix D, the matrix D being defined as $$D = \begin{bmatrix} x_1^1 & \ldots & x_i^1 & \ldots & x_n^1 \\ \ldots & \ldots & \ldots & \ldots & \ldots \\ x_1^j & \ldots & x_i^j & \ldots & x_n^j \\ \ldots & \ldots & \ldots & \ldots & \ldots \\ x_1^m & \ldots & x_i^m & \ldots & x_n^m \\ y_1^1 & \ldots & y_i^1 & \ldots & y_n^1 \\ \ldots & \ldots & \ldots & \ldots & \ldots \\ y_1^j & \ldots & y_i^j & \ldots & y_n^j \\ \ldots & \ldots & \ldots & \ldots & \ldots \\ y_1^m & \ldots & y_i^m & \ldots & y_n^m \end{bmatrix};$$ [Expression 2]

- obtaining singular values $\sigma_j$ ($\sigma_1 \geq \sigma_2 \geq \ldots \geq \sigma_r > 0$, where r is equal to a rank of the matrix D) of the matrix B as singular values of the matrix D;
- obtaining singular vectors of the matrix D for $\sigma_1$, $\sigma_2$ and $\sigma_3$;
- computing a matrix E satisfying $E=CC^T$ for a matrix C such that M=M'C, where M'=(L'($\Sigma$')$^{1/2}$, $\Sigma$' is a 3×3 matrix having $\sigma_1$, $\sigma_2$ and $\sigma_3$ as diagonal elements and the other elements being 0, and L' is a matrix having singular vectors of the matrix D corresponding to $\sigma_1$, $\sigma_2$ and $\sigma_3$ arranged from a left side in this order;
- computing the matrix C from the matrix E; and
- computing the three-dimensional coordinates $s_i$ ($X_i$, $Y_i$, $Z_i$) and the matrix M representing the transformation from the matrix C, wherein
the step of obtaining singular vectors of the matrix D for $\sigma_1$, $\sigma_2$ and $\sigma_3$ includes a step of performing a Twisted decomposition on a matrix $B^TB - \sigma_j^2 I$ by using a Miura inverse transformation, an sdLVvs transformation, an rdLVvs transformation and a Miura transformation so as to diagonalize a matrix $B^TB$, where I is a unit matrix.

4. A non-transitory computer readable medium storing a program for causing a computer to execute a document search process for searching information relating to a given keyword, the information being included in a given document, the document search process including the steps of:

receiving query vector q corresponding to the keyword;
performing an upper bidiagonalization on an index word document matrix D corresponding to the document so as to obtain an upper bidiagonal matrix B of the matrix D;
obtaining singular values $\sigma_j$ ($\sigma_1 \geq \sigma_2 \geq \ldots \geq \sigma_r > 0$, where r is equal to a rank of the matrix D) of the matrix B as singular values of the matrix D;
selecting k such that k<r;
computing an approximate matrix $D_k$ of the matrix D, the matrix $D_k$ being defined as $D_k = U_k \Sigma_k V_k^T$ by using a matrix $\Sigma_k$ having $\sigma_1, \sigma_2, \ldots, \sigma_k$ as diagonal elements and the other elements being 0, and left and right orthogonal matrices $U_k$, $V_k$ having only singular vectors corresponding to $\sigma_1, \sigma_2, \ldots, \sigma_k$ arranged from a left side in this order;
computing a similarity between the matrix $D_k$ and the query vector q; and
outputting a search result based on the computed similarity, wherein
the step of obtaining left and right orthogonal matrices $U_k$, $V_k$ of the matrix $D_k$ includes a step of performing a Twisted decomposition on a matrix $B^TB - \sigma_j^2 I$ (j=1, 2, ..., k) by using a Miura inverse transformation, an sdLVvs transformation, an rdLVvs transformation and a Miura transformation so as to diagonalize a matrix $B^TB$, where I is a unit matrix.

5. An apparatus for restoring a three-dimensional image from a plurality of two-dimensional images of an object, the apparatus comprising:
- means for receiving m number (m is an integer greater than or equal to 3) of two-dimensional images;
- means for extracting coordinates $d_{ij}$ ($x_{ij}$, $y_{ij}$) of feature points i (i=1, ..., n, where n is an integer greater than or equal to 2) in two-dimensional images j (j=1, ..., m); and
- means for computing three-dimensional coordinates $s_i$ ($X_i$, $Y_i$, $Z_i$) of the feature points and a matrix M representing a transformation from two-dimensional coordinates to three-dimensional coordinates based on the two-dimensional coordinates $d_{ij}$ ($x_{ij}$, $y_{ij}$) of the feature points, wherein
the means for computing three-dimensional coordinates $s_i$ ($X_i$, $Y_i$, $Z_i$) of the feature points and a matrix M representing a transformation from two-dimensional coordinates to three-dimensional coordinates includes:
- means for performing an upper bidiagonalization on a matrix D so as to obtain an upper bidiagonal matrix B of the matrix D, the matrix D being defined as $$D = \begin{bmatrix} x_1^1 & \ldots & x_i^1 & \ldots & x_n^1 \\ \ldots & \ldots & \ldots & \ldots & \ldots \\ x_1^j & \ldots & x_i^j & \ldots & x_n^j \\ \ldots & \ldots & \ldots & \ldots & \ldots \\ x_1^m & \ldots & x_i^m & \ldots & x_n^m \\ y_1^1 & \ldots & y_i^1 & \ldots & y_n^1 \\ \ldots & \ldots & \ldots & \ldots & \ldots \\ y_1^j & \ldots & y_i^j & \ldots & y_n^j \\ \ldots & \ldots & \ldots & \ldots & \ldots \\ y_1^m & \ldots & y_i^m & \ldots & y_n^m \end{bmatrix};$$ [Expression 3]

means for obtaining singular values $\sigma_j$ ($\sigma_1 \geq \sigma_2 \geq \ldots \geq \sigma_r > 0$, where r is equal to a rank of the matrix D) of the matrix B as singular values of the matrix D;

means for obtaining singular vectors of the matrix D for $\sigma_1$, $\sigma_2$ and $\sigma_3$;

means for computing a matrix E satisfying $E=CC^T$ for a matrix C such that $M=M'C$, where $M'=L'(\Sigma')^{1/2}$, $\Sigma'$ is a 3×3 matrix having $\sigma_1$, $\sigma_2$ and $\sigma_3$ as diagonal elements and the other elements being 0, and L' is a matrix having singular vectors of the matrix D corresponding to $\sigma_1$, $\sigma_2$ and $\sigma_3$ arranged from a left side in this order;

means for computing the matrix C from the matrix E; and means for computing the three-dimensional coordinates $s_i$ ($X_i$, $Y_i$, $Z_i$) and the matrix M representing the transformation from the matrix C, wherein the means for obtaining singular vectors of the matrix D for $\sigma_1$, $\sigma_2$ and $\sigma_3$ includes means for performing a Twisted decomposition on a matrix $B^TB-\sigma_j^2I$ by using a Miura inverse transformation, an sdLVvs transformation, an rdLVvs transformation and a Miura transformation so as to diagonalize a matrix $B^TB$, where I is a unit matrix.

6. An apparatus for searching information relating to a given keyword, the information being included in a given document, the apparatus comprising:

means for receiving query vector q corresponding to the keyword;

means for performing an upper bidiagonalization on an index word document matrix D corresponding to the document so as to obtain an upper bidiagonal matrix B of the matrix D;

means for obtaining singular values $\sigma_j$ ($\sigma_1 \geq \sigma_2 \geq \ldots \geq \sigma_r > 0$, where r is equal to a rank of the matrix D) of the matrix B as singular values of the matrix D;

means for selecting k such that $k<r$;

means for computing an approximate matrix $D_k$ of the matrix D, the matrix $D_k$ being defined as $D_k=U_k\Sigma_k V_k^T$ by using a matrix $\Sigma_k$ having $\sigma_1$, $\sigma_2$, ..., $\sigma_k$ as diagonal elements and the other elements being 0, and left and right orthogonal matrices $U_k$, $V_k$ having only singular vectors corresponding to $\sigma_1$, $\sigma_2$, ..., $\sigma_k$ arranged from a left side in this order;

means for computing a similarity between the matrix $D_k$ and the query vector q; and means for outputting a search result based on the computed similarity, wherein the means for obtaining left and right orthogonal matrices $U_k$, $V_k$ of the matrix $D_k$ includes means for performing a Twisted decomposition on a matrix $B^TB-\sigma_j^2I$ (j=1, 2, ..., k) by using a Miura inverse transformation, an sdLVvs transformation, an rdLVvs transformation and a Miura transformation so as to diagonalize a matrix $B^TB$, where I is a unit matrix.

* * * * *